United States Patent [19]

Summerville et al.

[11] Patent Number: 5,283,739
[45] Date of Patent: Feb. 1, 1994

[54] STATIC COLLISION AVOIDANCE METHOD FOR MULTIPLE AUTOMATICALLY GUIDED VEHICLES

[75] Inventors: David F. Summerville, Garland; John P. Williston; Martin A. Wand, both of Plano; Thomas J. Doty, Dallas; Haradon J. Rice, Plano, all of Tex.

[73] Assignee: Texas Instruments Incorporated, Dallas, Tex.

[21] Appl. No.: 265,206

[22] Filed: Oct. 31, 1988

Related U.S. Application Data

[60] Continuation-in-part of Ser. No. 129,914, Dec. 4, 1987, Pat. No. 4,887,013, which is a division of Ser. No. 771,379, Aug. 30, 1985, abandoned.

[51] Int. Cl.$^5$ .................. G06F 15/50; G05D 1/02
[52] U.S. Cl. .................. 364/424.02; 364/444; 395/90; 180/168
[58] Field of Search .................. 364/424.02, 513, 444, 364/461; 180/168, 169; 395/80, 90

[56] References Cited

U.S. PATENT DOCUMENTS

| | | | |
|---|---|---|---|
| 4,653,002 | 3/1987 | Barry | 364/424.02 |
| 4,674,048 | 6/1987 | Okumura | 364/424.02 |
| 4,817,000 | 3/1989 | Eberhart | 364/424.02 |
| 4,821,192 | 4/1989 | Taivalkoski et al. | 364/424.02 |
| 4,926,343 | 5/1990 | Tsuruta et al. | 364/513 |

FOREIGN PATENT DOCUMENTS 0182712  7/1988  Japan .................. 364/424.02

Primary Examiner—Vincent N. Trans
Attorney, Agent, or Firm—Richard L. Donaldson; Frederick J. Telecky; Wade James Brady

[57] ABSTRACT

The invention is a method of static collision avoidance for multiple automatically guided vehicles (AGVs) on bidirectional paths. It defines the allowable travel path for an AGV as a series of path segments through or between possible destination points (called nodes) which are defined for the factory floor. AGVs can move to or through any of these nodes and can arrive in a predetermined order, according to "rules" defined by the method. The invention provides better performance than conventional AGV systems by allowing multiple AGVs to coexist in the same pathways without collision or excessive queueing in systems which use free-roving AGVs having programmable bidirectional paths. This new ability maximizes the degrees of freedom of AGV movement while minimizing collisions and "deadlock."

5 Claims, 22 Drawing Sheets

| TIME:<br>NODE: | T1 | T2 | T3 | T4 | T5 | RULES: |
|---|---|---|---|---|---|---|
| 1 | AGV 1 | | | | | NONE |
| 2 | AGV 3 | AGV 3 | AGV 3 | AGV 3 | AGV 3 | NONE |
| 3 | | AGV 1 | | | | NONE |
| 4 | | | AGV 1 | | | NONE |
| 5 | | | | | | NONE |
| 6 | | | | AGV 1 | | NONE |
| 7 | | | | | AGV 1 | NONE |
| 8 | AGV 2 | AGV 2 | AGV 2 | AGV 2 | AGV 2 | NONE |

*Fig. 7*

| TIME NODE: | T1 | RULES: |
|---|---|---|
| 1 | AGV 1 | AGV2 MUST ARRIVE AFTER AGV1 |
| 2 | AGV 3 | NONE |
| 3 | | AGV2 MUST ARRIVE AFTER AGV1 |
| 4 | | NONE |
| 5 | | NONE |
| 6 | | AGV2 MUST ARRIVE BEFORE AGV1 |
| 7 | | NONE |
| 8 | AGV 2 | NONE |

| TIME:<br>NODE: | T2 | RULES: |
|---|---|---|
| 1 |  | AGV2 MUST ARRIVE AFTER AGV1 |
| 2 | AGV 3 | NONE |
| 3 | AGV 1 | AGV2 MUST ARRIVE AFTER AGV1 |
| 4 |  | NONE |
| 5 |  | NONE |
| 6 | AGV 2 | AGV2 MUST ARRIVE BEFORE AGV1 (SATISFIED) |
| 7 |  | NONE |
| 8 |  | NONE |

| TIME:<br>NODE: | T3 | RULES: |
|---|---|---|
| 1 | | AGV2 MUST ARRIVE AFTER AGV1 |
| 2 | AGV 3 | NONE |
| 3 | | AGV2 MUST ARRIVE AFTER AGV1 |
| 4 | AGV 1 | NONE |
| 5 | AGV 2 | NONE |
| 6 | | NONE |
| 7 | | NONE |
| 8 | | NONE |

| TIME:<br>NODE: | T4 | RULES: |
|---|---|---|
| 1 |  | AGV2 MUST ARRIVE AFTER AGV1 |
| 2 | AGV 3 | NONE |
| 3 | AGV 2 | AGV2 MUST ARRIVE AFTER AGV1 (SATISFIED) |
| 4 |  | NONE |
| 5 |  | NONE |
| 6 | AGV 1 | NONE |
| 7 |  | NONE |
| 8 |  | NONE |

| TIME: | T5 | RULES: |
|---|---|---|
| NODE: | | |
| 1 | AGV 2 | AGV2 MUST ARRIVE AFTER AGV1 (SATISFIED) |
| 2 | AGV 3 | NONE |
| 3 | | NONE |
| 4 | | NONE |
| 5 | | NONE |
| 6 | | NONE |
| 7 | AGV 1 | NONE |
| 8 | | NONE |

TIME: T1  RULES:

NODE:

| | | |
|---|---|---|
| 1 | AGV 1 | AGV2 MUST ARRIVE AFTER AGV1 |
| 2 | AGV 3 | NONE |
| 3 | | AGV2 MUST ARRIVE AFTER AGV1<br>AGV3 MUST ARRIVE AFTER AGV1<br>AGV3 MUST ARRIVE BEFORE AGV2 |
| 4 | | AGV3 MUST ARRIVE AFTER AGV1 |
| 5 | | NONE |
| 6 | | AGV2 MUST ARRIVE BEFORE AGV1<br>AGV3 MUST ARRIVE AFTER AGV1<br>AGV3 MUST ARRIVE AFTER AGV2 |
| 7 | | NONE |
| 8 | AGV 2 | AGV3 MUST ARRIVE AFTER AGV2 |

| TIME:<br>NODE: | T1 | RULES: |
|---|---|---|
| 1 |  | AGV2 MUST ARRIVE AFTER AGV1 |
| 2 | AGV 3 | NONE |
| 3 | AGV 1 | AGV2 MUST ARRIVE AFTER AGV1<br>AGV3 MUST ARRIVE AFTER AGV1<br>AGV3 MUST ARRIVE BEFORE AGV2 |
| 4 |  | AGV3 MUST ARRIVE AFTER AGV1 |
| 5 |  | NONE |
| 6 | AGV 2 | AGV2 MUST ARRIVE BEFORE AGV1<br>AGV3 MUST ARRIVE AFTER AGV1<br>AGV3 MUST ARRIVE AFTER AGV2 |
| 7 |  | NONE |
| 8 |  | AGV3 MUST ARRIVE AFTER AGV2 |

| TIME:<br>NODE: | T3 | RULES: |
|---|---|---|
| 1 |  | AGV2 MUST ARRIVE AFTER AGV1 |
| 2 |  | NONE |
| 3 | AGV 3 | AGV2 MUST ARRIVE AFTER AGV1<br>AGV3 MUST ARRIVE AFTER AGV1 (SATISFIED)<br>AGV3 MUST ARRIVE BEFORE AGV2 |
| 4 | AGV 1 | AGV3 MUST ARRIVE AFTER AGV1 |
| 5 | AGV 2 | NONE |
| 6 |  | AGV2 MUST ARRIVE BEFORE AGV1<br>AGV3 MUST ARRIVE AFTER AGV1<br>AGV3 MUST ARRIVE AFTER AGV2 |
| 7 |  | NONE |
| 8 |  | AGV3 MUST ARRIVE AFTER AGV2 |

| TIME: T4 | | RULES: |
|---|---|---|
| NODE: | | |
| 1 | | AGV2 MUST ARRIVE AFTER AGV1 |
| 2 | | NONE |
| 3 | AGV 2 | AGV2 MUST ARRIVE AFTER AGV1 (SATISFIED) |
| | | AGV3 MUST ARRIVE BEFORE AGV2 (SATISFIED) |
| 4 | AGV 3 | AGV3 MUST ARRIVE AFTER AGV1 (SATISFIED) |
| 5 | | NONE |
| 6 | AGV 1 | AGV2 MUST ARRIVE BEFORE AGV1 (SATISFIED) |
| | | AGV3 MUST ARRIVE AFTER AGV1 |
| | | AGV3 MUST ARRIVE AFTER AGV2 |
| 7 | | NONE |
| 8 | | AGV3 MUST ARRIVE AFTER AGV2 |

| TIME: T5 | | RULES: |
|---|---|---|
| NODE: | | |
| 1 | AGV 2 | AGV2 MUST ARRIVE AFTER AGV1 (SATISFIED) |
| 2 | | NONE |
| 3 | | NONE |
| 4 | | NONE |
| 5 | | NONE |
| 6 | AGV 3 | AGV2 MUST ARRIVE BEFORE AGV1 (SATISFIED)<br>AGV3 MUST ARRIVE AFTER AGV2 (SATISFIED) |
| 7 | AGV 1 | NONE |
| 8 | | AGV3 MUST ARRIVE AFTER AGV2 |

| TIME: T6 | | RULES: |
|---|---|---|
| NODE: | | |
| 1 | AGV 2 | NONE |
| 2 | | NONE |
| 3 | | NONE |
| 4 | | NONE |
| 5 | | NONE |
| 6 | | |
| 7 | AGV 1 | NONE |
| 8 | AGV 3 | AGV3 MUST ARRIVE AFTER AGV2 (SATISFIED) |

STATIC COLLISION AVOIDANCE METHOD FOR MULTIPLE AUTOMATICALLY GUIDED VEHICLES

This Patent Application is a continuation-in-part of U.S. patent application Ser. No. 129,914 filed on Dec. 4, 1987, now U.S. Pat. No. 4,887,013 which is a divisional of U.S. patent application Ser. No. 771,379 filed on Aug. 30, 1985, now abandoned which is incorporated by reference hereby.

RELATED U.S. PATENT APPLICATIONS

This invention is related to the following U.S. Patent Applications, assigned to Texas Instruments Incorporated.

| Serial No. | Status | Patent No. | Issue Date |
|---|---|---|---|
| 771,397 | Issued | 4,779,203 | 10/18/88 |
| 771,433 | Issued | 4,706,1120 | 11/10/87 |
| 772,061 | Abandoned | | |
| 771,380 | Issued | 4,789,940 | 12/6/88 |
| 771,432 | Issued | 4,754,402 | 6/28/88 |
| 771,431 | Abandoned | | |
| 772,280 | Abandoned | | |
| 771,442 | Abandoned | | |
| 771,443 | Issued | 4,745,551 | 5/17/88 |
| 771,322 | Abandoned | | |
| 771,379 | Abandoned | | |
| 771,329 | Abandoned | | |
| 771,459 | Issued | 4,750,123 | 6/7/88 |
| 771,545 | Issued | 4,959,802 | 9/5/90 |
| 222,322 | Issued | 4,887,223 | 12/12/89 |
| 195,345 | Issued | 4,882,694 | 11/21/89 |
| 129,914 | Issued | 4,887,013 | 12/12/89 |
| 909,737 | Abandoned | | |
| 191,834 | Abandoned | | |
| 265,206 | Allowed | | |
| 265,070 | Issued | 4,926,103 | 5/15/90 |
| 265,068 | Abandoned | | |
| 265,207 | Allowed | | |
| 265,196 | Issued | 4,940,925 | 7/10/90 |

BACKGROUND OF THE INVENTION

1. Field of the Invention

This invention relates to guidance and control methods for automatically guided vehicle (AGV) systems such as mobile robots and more specifically to methods for coordinating the interaction of multiple autonomous or semi-autonomous vehicles in a factory.

2. Description of the Related Art

Conventional automatically guided vehicles (AGVs) such as those used to move materials in warehouses and factories provide minimal (unidirectional) point-to-point movement control. Most such systems involve AGVs which follow a fixed guide track, usually either a radio transmitter antenna wire buried in the factory floor, a reflective stripe painted on the floor, or a reflective tape glued to the floor. Such methods are described in U.S. Pat. Nos. 4,530,056, 4,554,724, 4,562,635, 4,593,238, and 4,593,239. All of these schemes purposely limit the individual vehicle's freedom of movement by constraining the AGVs to follow a physically fixed path. Such schemes also are expensive to change due to the need to dig up or otherwise remove the existing path and reinstall it in a new configuration.

Most systems rely on on-vehicle proximity detection, such as active bumpers or ultrasonic sensors, to deal with collisions with other AGVs, stationary objects, or personnel. In such systems, the only way to prevent "deadlocks" (where two AGVs move toward each other, each senses the other, both stop, and are effectively prevented from moving again by their "locked" on-board sensors) is to forbid bidirectional travel along the path. In such cases, AGVs can move in only one direction on a given path.

FIG. 1 shows such a system. An AGV can move in only one direction in the path. To go from point A to point D, it must first pass through B and C. It cannot go directly to D. Even if the AGV itself is capable of accurate backing, a deadlock could occur if it were approached from behind by another AGV. Each AGV would sense the other and both would stop.

In those few instances where an AGV is capable of reversing, it does so by "backing up." Conventional AGV systems prohibit such motion except for individual AGVs which are under manual control (i.e., removed from the system by an operator). The guide wires or stripes contain locator strips or cross-wise antennas to provide AGV location information. Sometimes, such systems provide absolute location information by attaching bar-code markers at a fixed height along the path. When an AGV passes such a marker, it "reads" the location from the marker. Wire-guided AGVs detect the location markers via radio reception. Stripe-guided AGVs use optical detectors to sense coded reflective markers. Other AGVs, such as automated forklifts, employ bar-code scanners to decode the location markers. Altering the pathways for these systems involves considerable facilities engineering, especially in the case of those which use buried wires.

In such systems, therefore, the individual AGVs are not capable of true point-to-point motion. For example, to drive an AGV to a particular point, the system controller commands it to move until it finds the marker for that point. The AGV effectively is "lost" to the control system until it reaches a location marker. Moreover, the AGV must follow the physical track, passing each and every intermediate marker in the physically fixed sequence, until it "reads" its destination. There is no external position sensing and reporting system to provide "closed-loop, servo-like" operation.

Since most AGVs are front-drive units, or three-wheeled vehicles similar to tricycles (one steered drive wheel in front, two differentiated trailing wheels at the rear), they have less control when moving in reverse.

In conventional multiple-AGV systems, these constraints lead to a "train" or queueing effect: when one AGV stops, all following AGVs must stop (as they approach one another). FIG. 2 shows a typical 3-vehicle loop-type AGV system. There is no way for AGV 3 to overtake AGV 2 because AGV 3's proximity detectors will prevent a collision with AGV 2 and neither AGV can leave the path to let the other pass. Furthermore, if AGV 1 stops, then AGV 2 will stop and AGV 3 will stop (as soon as their sensors detect the AGV ahead). No AGV can move until the one ahead of it moves. In other words, the individual AGVs act almost as if they were "cars" in a "train," as if they were physically connected. There is no way to send AGV 3 to a destination which lies ahead of AGV 1 unless and until both AGV 1 and AGV 2 pass that destination.

Important disadvantages in the prior art, then, are: it is limited by closed pathways, by unidirectional motion, by lack of external control of AGV motion, and by lack of independent, real-time collision avoidance. Even if these limitations somehow could be overcome, there still would remain the obstacles of "deadlock" and what to do when one AGV crosses the path of another or arrives simultaneously at the same destination as another.

SUMMARY OF THE INVENTION

The invention improves the performance of AGV systems by allowing multiple AGVs to coexist in the same pathways without collision or excessive queueing in systems which use free-roving AGVs having programmable bidirectional paths. This new ability maximizes the degrees of freedom of AGV movement while preventing collisions and "deadlock."

The method uses the control scheme set forward in Texas Instruments application (U.S. Ser. No. 771,397) incorporated herein by reference, where an external system executive coordinates the tasks of multiple, independently running, computerized control programs which include a communications controller, a central data base, on-board vehicle controllers, a vehicle routing and scheduling controller, and a visual navigation system to provide factory-floor position information updates to free-roving mobile robot AGVs which incorporate on-board dead-reckoning. The most recent embodiment of such a system is described in TI application Ser. No. 771,397, co-pending. In the TI systems, the AGVs travel within programmable pathways. The AGVs are omnidirectional and can rotate in place; that is, they have a zero turning radius and can move with equal control in any direction. This scheme allows the AGVs to operate in a minimum of pathway space but simultaneously to service a factory layout with maximum efficiency. Furthermore, since the path is not physically attached to the floor, and since the external control scheme can identify the individual AGVs separately, the AGVs can pass each other in any direction, with or without stopping.

TERMS USED IN DESCRIBING THE INVENTION

The invention described herein is a method of static collision avoidance for multiple AGVs on bidirectional paths. It defines the allowable travel path for an AGV as a series of path segments through or between possible destination points (called nodes) which are defined for the factory floor. AGVs can move to or through any of these nodes and can arrive in a predetermined order, according to "rules" defined in and assigned by the invention.

The following descriptions of the invention incorporate several key terms including: nodes, path, path segments, path table, rules, physical rule conflict, logical rule conflict, data base, and AGV.

The physical operating environment of the invention is assumed to be a factory. An AGV is an automatically guided vehicle. When the AGV control system is installed in the factory, the system operators select an arbitrary physical marker as the "factory origin." Using measuring tapes or surveyor's equipment, the location of each machine, each node, and each external visual navigation system television camera is determined and then entered into the external system computer data base as a "factory map." The factory map and its information about the location of the nodes is stored in a central computer data base accessible to each of the independently operating control programs, of which the invention is one. A node is a specific location (in factory-floor coordinates) in the factory. Factory-floor coordinates are positions in Cartesian coordinates, using the factory origin as the point (0.0).

A node is defined for each machine to be serviced, for each place in the factory where an AGV may need to be parked (servicing areas, battery-charging stations, and the like), and for any point in the factory where AGVs routinely may be required to turn or rotate. When a node is defined, it also is identified with the external visual navigation system camera which can "see" it.

Path segments connect each pair of nodes. For example, a path segment consists of a starting node, an ending node, and all the "empty" (i.e., nonassigned) space in between. Rather than directing an AGV to travel from one node to another, the external system controller "reserves" for the AGV the path segments which connect the two nodes. It does this by using the rule-assembling routines to transform the node list from the external data base into a group of rule-defined path segments, then storing those segments in an area of the external data base called the final path table.

The invention implements computer programs which assign "rules" of travel to each node. A rule is a logical statement which controls one of five possible arrival or departure states for a given node. For example, one system rule states that "No AGV can arrive at a node before another AGV departs that node." This allows the invention to logically (not physically) prevent one AGV from crashing into another which is parked at a node. The distinction between logical and physical conflicts is important. The invention described herein takes no physical action whatever. It computes sets of rules and chains together the sets for a continguous sequence of nodes to form a "path."

Physical control is afforded by a combination of an independently operating visual navigation system which monitors the locations of the AGVs as they move among the nodes and multiple (one for each AGV) independently operating on-board control programs which incorporate dead-reckoning software. The absolute position data for the dead-reckoning software is generated by the steering and drive mechanisms in the AGVs. The AGV positions reported by the visual navigation system are recorded in the AGV's on-board memory. It is this combination of control programs which allows the external system controller to direct the system in such a way that the invention's routines provide protection against physical AGV collisions and deadlocks.

The data base described herein is not a part of, but is shared by, the invention. The data base is part of a system computer's memory and is accessed by various control programs. It is a structured data base, providing each control program (including the invention) the ability to "know" what kind of data resides where in memory. Essentially, this data base is accessed by several independent tasks which operate under control of separate computers. For example, there is a separate vehicle application task (program) for each AGV in the system. These tasks can access the central data base individually, as their current situation demands. The invention also accesses the data base: sometimes using information put there by other tasks, sometimes depositing information there for use by other tasks, and sometimes storing or retrieving information for its own use.

FUNCTIONS OF THE INVENTION

These factors allow the external system controller to direct an AGV to any given node in the factory. The invention implements its control scheme in a computer memory bank. This amounts to a "logical" analogy to the actual operation in the factory. The logical control scheme takes the form of a hierarchical system of rules for each node. The external system controller acts to justify the desired physical operation with the invention's logical analog of that operation. Assuming the invention's "rules" are satisfied in doing so, the result is collision-free AGV system operation.

For example, as shown in FIG. 3, any of AGVs 1, 2, or 3 can be routed to or through any destination node A through J. AGVs 1 and 2 can be routed to Node E, for example, but AGV 2 normally will arrive sooner because it is closer. The "rules," however, can be set to prevent AGV 2 from arriving at Node E prior to AGV 1. This can be useful when AGV 1 is carrying a load needed by Node E and which must be picked up by AGV 2 at Node E only after Node E has processed it. The invention makes it possible for an external controller to implement a route or a schedule, or both, for an AGV. This invention provides the control necessary to prevent collisions between multiple AGVs operating in the same physical space(s).

The invention avoids deadlocks by allowing bidirectional travel in concert with the system "rules." Referring now to FIG. 4, an external control computer, for example, would compute the paths of AGVs 2 and 3 if both were commanded to go to Node D. If the external controller calculates the shortest (distance) path, it would take both AGVs through Node E. With conventional control schemes this would mean that AGV 3 must wait for AGV 2 to pass Node E prior to moving through Node E itself. The invention, however, provides the means to establish rules such that AGV 3 must visit Node E prior to AGV 2. In such a case, a conventional wire- or stripe-guided AGV system would deadlock because there is no way for AGV 3 to reach Node E until AGV 2 passes the node because:

conventional AGVs lack the control and dead-reckoning accuracy necessary for AGV 3 to "back up" while turning the corners necessary to reach Node E by going through Nodes J and H, and conventional AGVs deadlock in head-to-head encounters such as would occur if AGVs 1 and 3 met in the vicinity of Node C.

The invention's best embodiment is in a system of free-roving AGVs (such as that disclosed in TI application, U.S. application Ser. No. 771,397 or TI application Ser. No. 265,196, co-pending) which are not constrained to follow a physical track.

FIG. 5 shows the factory floor plan for the rule-assignment and AGV-movement diagrams in FIGS. 6 through 29. A real-world factory would have machines, pathway intersections, or AGV turning points at each of the nodes 1 through 8.

FIGS. 6 through 29 relate to a schematic floor plan of a typical manufacturing environment. In these figures, points 1 through 8 are possible destination points, called nodes, for the AGVs. The nodes are connected by path segments along which an AGV may travel between the nodes. The arrows indicate the desired directions of travel for an AGV. All other regions of the factory are off-limits to the AGVs. Machines requiring servicing would be located along either side of each of the defined paths (sequences of nodes) at a node. In FIGS. 6 through 29, T1 through T6 indicate discrete, consecutive time intervals. To simplify this discussion, it is assumed that the AGVs travel at the rate of one node per time interval. In practice, of course, time and distance are continuous and differentiated, so that the distance (and therefore time) between nodes varies.

BRIEF DESCRIPTION OF THE DRAWINGS

FIG. 7 is a list of the rules which control the movement of the AGVs along the paths illustrated in FIG. 6.

DESCRIPTION OF THE PREFERRED EMBODIMENT

Figure 1:
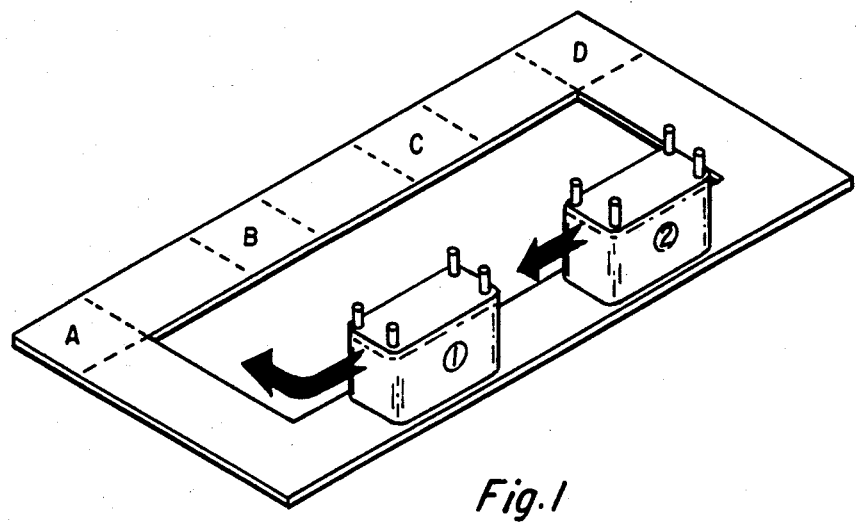
FIG. 1 illustrates a typical closed-loop AGV system.
Figure 2:
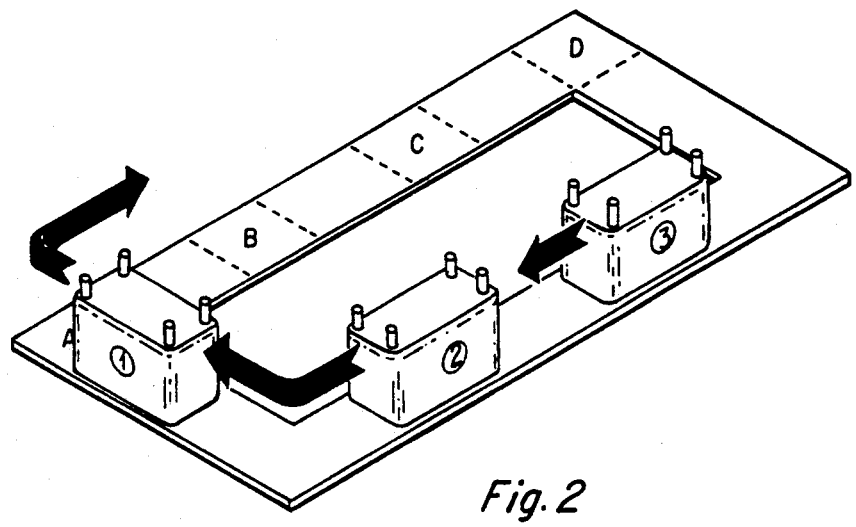
FIG. 2 illustrates the "train" or "queueing" effect in AGV systems.
Figure 3:
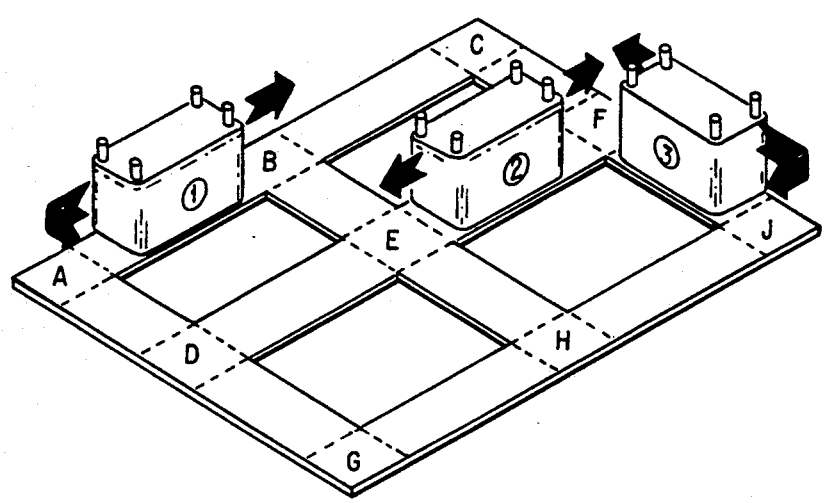
FIG. 3 shows the invention's flexibility in AGV routes.
Figure 4:
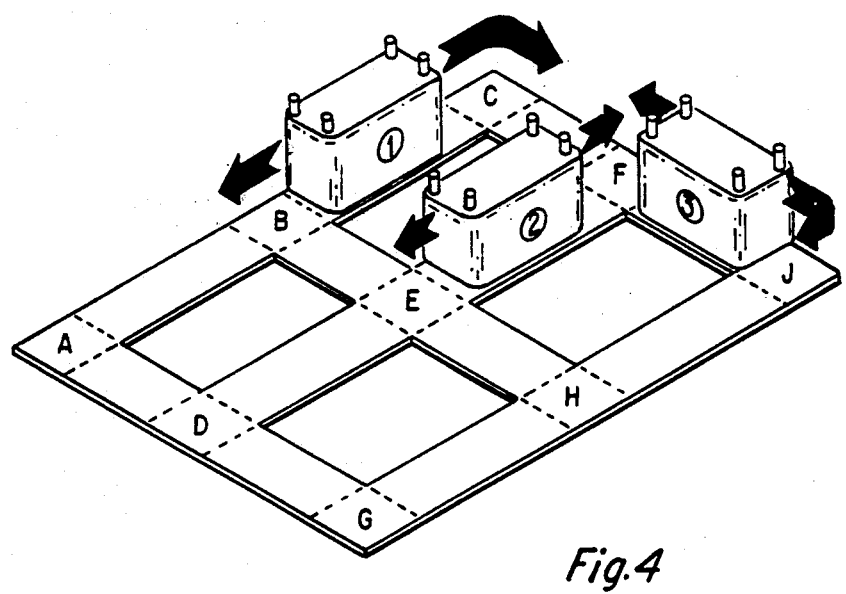
FIG. 4 shows how the invention avoids deadlocks.
Figure 5:
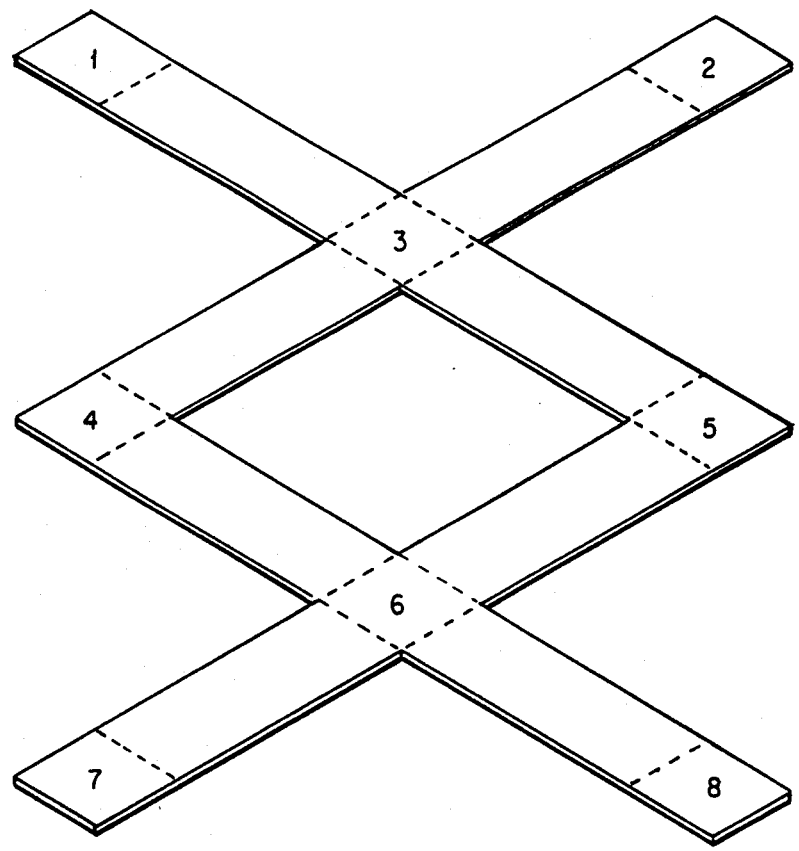
FIG. 5 is a conceptual schematic floor plan of a typical factory, showing the nodes (possible destinations) and the path segments which connect them. This floor plan is the same as those in FIGS. 6 through 29.

The best form of the invention is a method of implementing the nodes such that a control computer can generate and monitor the rules of travel for a system of free-roving AGVs as described in TI application (U.S. application Ser. No. 771,397) or TI application Ser. No. 265,196 (co-pending).

In such a system, a node is a region in space (such as an area of a factory floor) which is monitored by a downward-aimed television camera. The control computer system uniquely identifies this region of space and relates it to factory floor coordinates and to a particular TV camera. The TV cameras are connected to an external visual navigation system which provides position data to the AGV controllers.

The control computer software responds to requests for travel by allocating nodes to individual AGVs in the following manner: by checking the rules for AGV arrival and departure at all nodes between origin and destination and then by reserving a short sequence of nodes for the AGV. Conflicts are avoided by balancing a request to move an AGV to a node against the invention's rules. Collisions are avoided by reserving specific nodes for one and only one specific AGV at a time, according to the node sequences and the system's rules.

The system controller (which is not part of this invention) monitors the nodes by communicating with the AGV controllers which receive location and orientation updates from the visual navigation system. The visual navigation system is described in TI application U.S. Ser. No. 771,397 et al (as U.S. Ser. Nos. 772,280, 771,322, 771,329, 771,459, 771,432, 772,061 and 265,196 co-pending).

The system reacts to node arrivals and departures by checking the AGV node lists and the rules for the next node to determine what action to take with respect to individual AGVs. For example, if the information in the central data base indicates that an AGV is to leave a node at a specific time, the control afforded by the invention takes the form of checking to see whether a next node is defined for the AGV and whether that node is occupied or reserved for another AGV at the time the target AGV would arrive there. If the rules which would free the next node have not been satisfied, the control method is to delay the time the AGV is to arrive at that node. This information is placed in the central data base as part of the AGV's path description. Other external control programs access the data base for routing and scheduling information. The AGV's onboard controller requests movement instructions from the central data base via the external communications controller. An AGV moves only to nodes. Motion is defined only for short sequences of nodes which form paths (which appear in the central data base only after having been tested by the invention to resolve rule conflicts). Therefore, the paths defined by the invention, in conjunction with the other elements of the control system (external to the invention) in effect provide the means to slow, redirect, or stop the AGV until the node is free.

The AGV may travel from one factory location to another provided a set of contiguous path segments exists between the two locations. When multiple AGVs are allowed to travel along the same paths, each AGV's arrival at, and departure from, a given node must be coordinated in time with the motions of the other AGVs to avoid deadlocks and collisions. To coordinate an AGV's travel through the factory, a set of rules controls the arrival and departure of the AGVs at each node along the defined path. When it becomes necessary to allow multiple AGVs to visit the same node, the invention's rules will determine which AGV will be allowed to visit the node first. Once the rules are established for a path segment, they are followed until the AGV visits a node which will not be occupied by another AGV.

Five rules are needed to prevent collisions and deadlocks between AGVs:

1) If an AGV is to arrive at a node after another AGV has departed that node, the AGV must arrive at all subsequent nodes after the other AGV departs these nodes until the AGV passes through a node which the other AGV will not occupy.

2) If an AGV is to arrive at a node before another AGV has arrived at that node, the AGV must arrive at all subsequent nodes before the other AGV arrives at these nodes until the AGV passes through a node which the other AGV will not occupy.

3) No AGV can arrive at a node before another AGV departs that node.

4) If an AGV is to arrive at a node which no other AGV will use, the previous rule of travel for the AGV, if any, is reset and the AGV will proceed with no rules until a condition arises which requires a rule to be established.

5) No AGV can plan to use a node if another AGV occupies that node and does not have a plan to depart that node.

FIGS. 6 through 29 illustrate the application of the rules which control the arrival and departure of AGVs in a typical multi-AGV, multi-node system. The figures show the paths of the AGVs and the nodes where the AGVs will be for specific time intervals.

Figure 6:
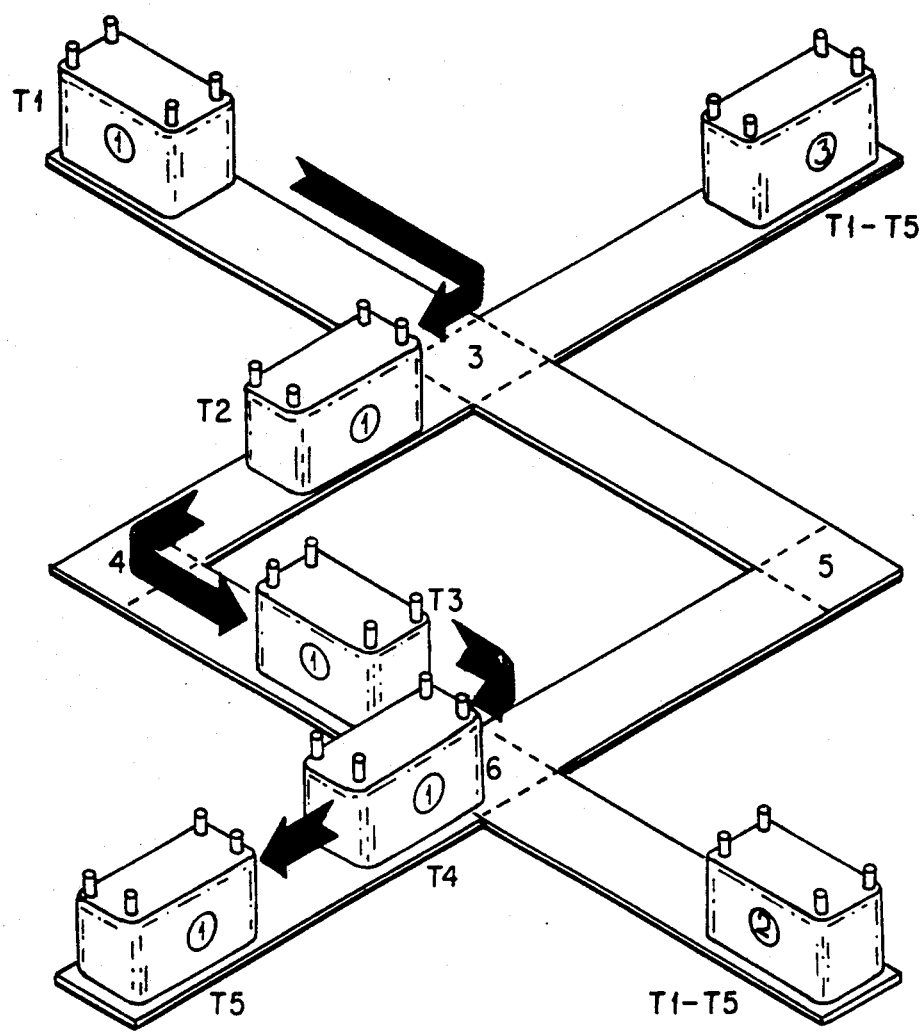
FIG. 6 is a drawing showing a possible set of paths for an AGV to follow in a typical factory.

FIG. 6 shows a possible set of path segments for the AGVs to follow through a typical factory. Points 1 through 8 are possible destination nodes. The three AGVs are shown in their initial positions (during time interval t1). The arrows indicate the desired path for AGV 1.

In FIG. 6 only the path for AGV 1 has been generated. AGV 1 will start moving from Node 1, will pass through Nodes 3, 4, and 6, and then will stop at Node 7. FIG. 7 shows the nodal positions of AGV 1 for each of the five time intervals. In FIG. 7 the rules that will control the AGV's movement are defined. Because AGV 1 will not visit any node where another AGV will visit, there are no rules of travel established for AGV 1.

Figures 8, 9:
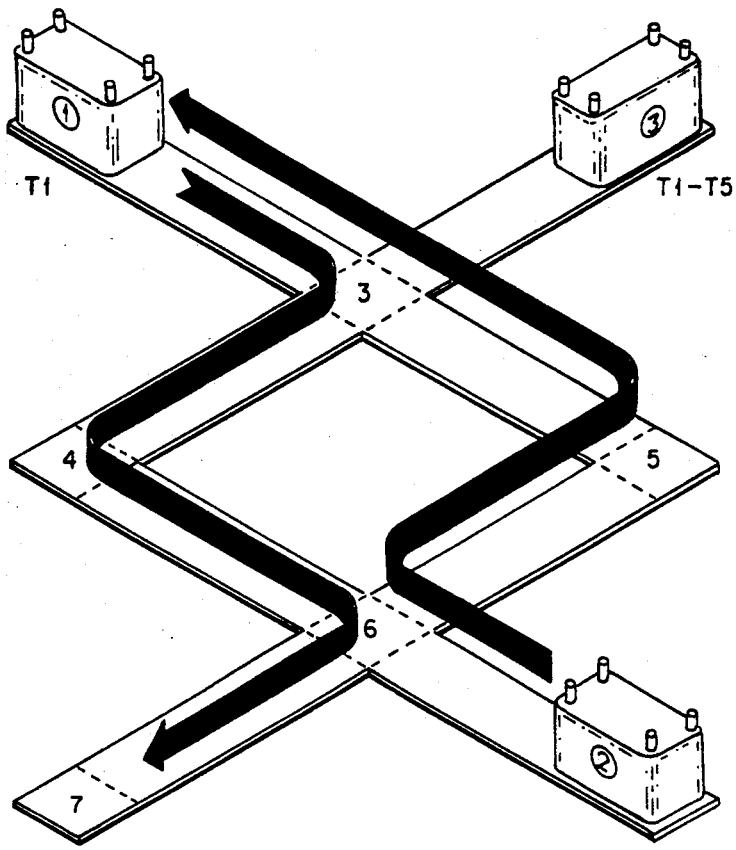
FIG. 8 is a drawing showing a possible path for each of two AGVs to follow in the typical factory illustrated in FIG. 6.
FIG. 9 is a list of the rules which control the movement of the AGVs along the paths illustrated in FIG. 8.

FIG. 8 illustrates the same situation, except that AGV 2 also is allowed to move. In FIG. 8 the paths for AGV 1 and AGV 2 have been generated. AGV 2 will start moving from Node 8, will pass through Nodes 6, 5, and 3, and will stop at Node 1. Nodes 6 and 3 are common to both AGV 2's and AGV 1's paths. This creates a potential conflict between the two AGVs at two points (6 and 3).

FIG. 9 shows the nodal positions with respect to time for all three AGVs during the first time interval. FIG. 9 also shows the rules which will coordinate each AGV's visit to the nodes in the factory. As shown in FIG. 7, AGV 1 already has selected a path through Nodes 3, 4, and 6. Therefore for AGV 2 to move from Node 2 to Node 8 a new path must be generated without changing the path for AGV 1.

Figures 10, 11:
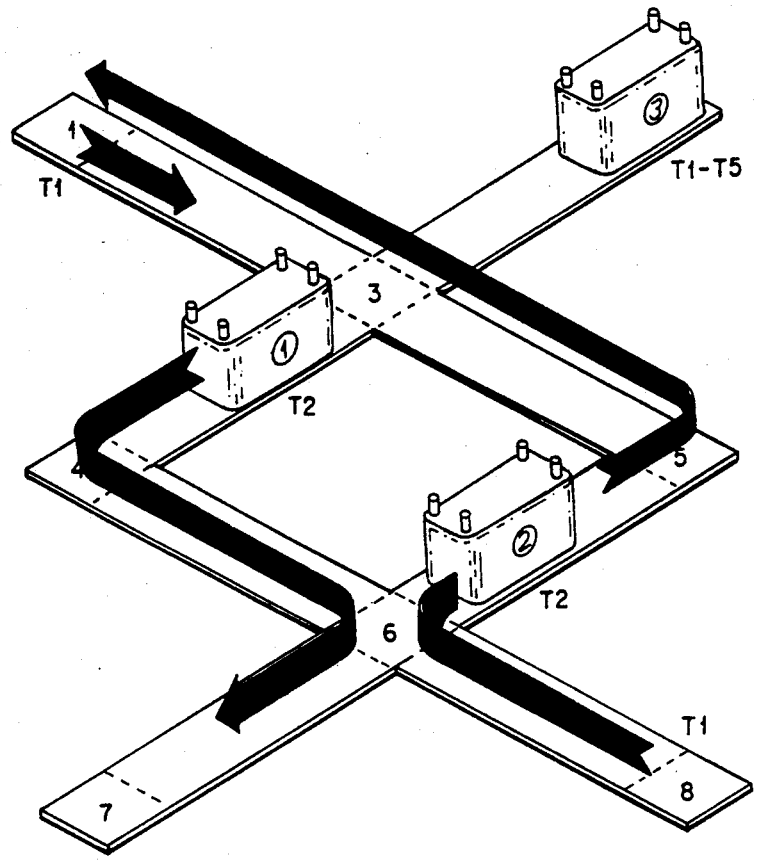
FIG. 10 is a drawing showing the displacement at the end of the second time interval for both of the AGVs en route to their destinations as given in FIG. 8.
FIG. 11 is a list of the rules in effect for the AGV movements depicted in FIG. 10.

As shown in FIG. 10, AGV 2 first must attempt to move to Node 6. AGV 2's earliest possible arrival at Node 6 is at the second time interval. Because AGV 1 will occupy Node 6 during the fourth time interval, AGV 2 can move to Node 6 before AGV 1 arrives. As shown in FIG. 11, the rule of travel for AGV 2 is established such that AGV 2 always must arrive at nodes before AGV 1 until AGV 2 visits a node which is not common between the two AGVs.

Figures 12, 13:
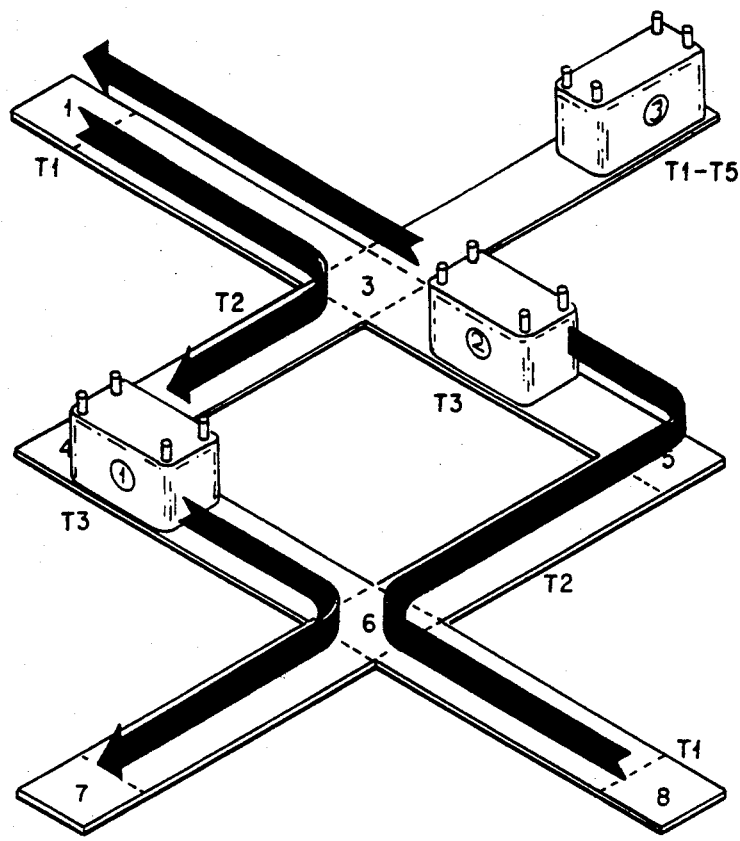
FIG. 12 is a drawing showing the displacement at the end of the third time interval for both of the AGVs enroute to their destinations as given in FIG. 8.
FIG. 13 is a list of the rules in effect for the AGV movements depicted in FIG. 12.

As shown in FIG. 12, from Node 6, AGV 2 has two ways to move toward its destination at Node 1. The first choice is Node 4. The earliest possible time AGV 2 could occupy Node 4 is the third time interval. Refer now to FIG. 13. Because AGV 1 already has Node 4 reserved for the third time interval, AGV 2 can only arrive at Node 4 after AGV 1. The current rule of travel for AGV 2 allows AGV 2 to arrive at nodes before AGV 1. Because AGV 2 can occupy Node 4 only after AGV 1, AGV 2 can't move to Node 4 without violating the current rule of travel. Therefore AGV 2 can't move to Node 4.

Returning now to FIG. 12, clearly AGV 2's second choice for a move is to Node 5. Because no other AGV has reserved Node 5 at any time interval, AGV 2 can move to Node 5. The rule of travel established at Node 6 allows AGV 2 to arrive before AGV 1 until AGV 2 moves to a node which is not used by AGV 1. Node 5 is not used by AGV 1. Therefore the rule of travel for AGV 2 is reset (cleared) for Node 5.

Figures 14, 15:
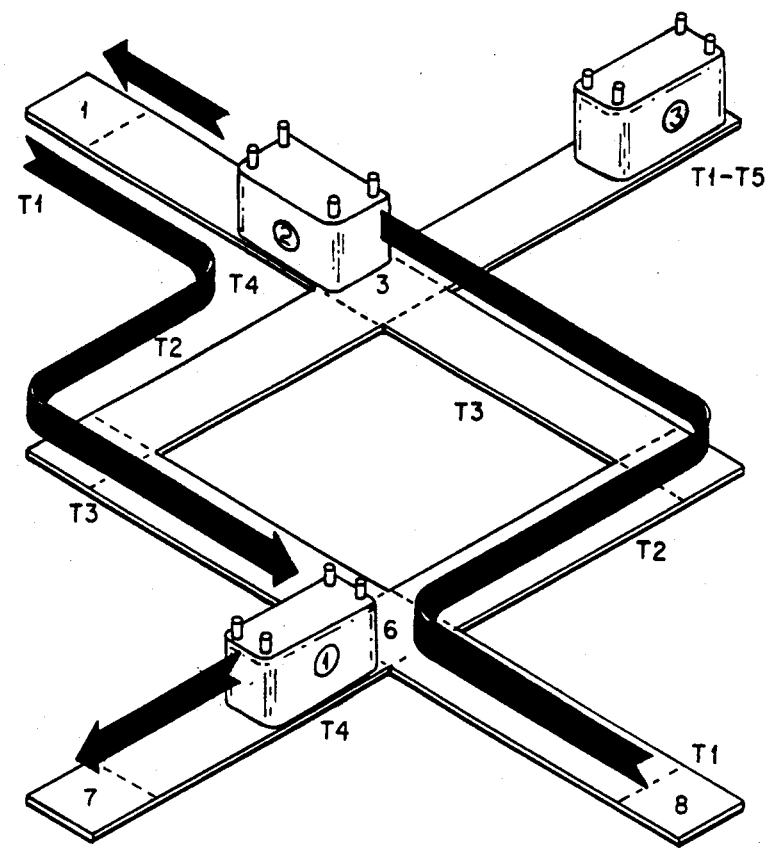
FIG. 14 is a drawing showing the displacement at the end of the fourth time interval for both of the AGVs enroute to their destinations as given in FIG. 8.
FIG. 15 is a list of the rules in effect for the AGV movements depicted in FIG. 14.

As shown in FIG. 14, AGV 2 must move to Node 3 next. But AGV 1 also visits Node 3. The distance required for AGV 1 to reach Node 3 is less than that for AGV 2 to reach Node 3, so a rule is set such that AGV 2 must arrive at Node 3 after AGV 1 departs Node 3. AGV 1 is to arrive at Node 3 in the second time interval. AGV 2's earliest possible arrival at Node 3 is at the fourth time interval. Therefore, there is no conflict between the AGVs during the fourth time interval because AGV 1 already has cleared the node. So AGV 2 can move to Node 3 during the fourth time interval. As shown in FIG. 15, the rule of travel for AGV 2 is established such that AGV 2 must always arrive at nodes after AGV 1 until AGV 2 visits a Node which is not common to the two AGVs.

Figures 16, 17:
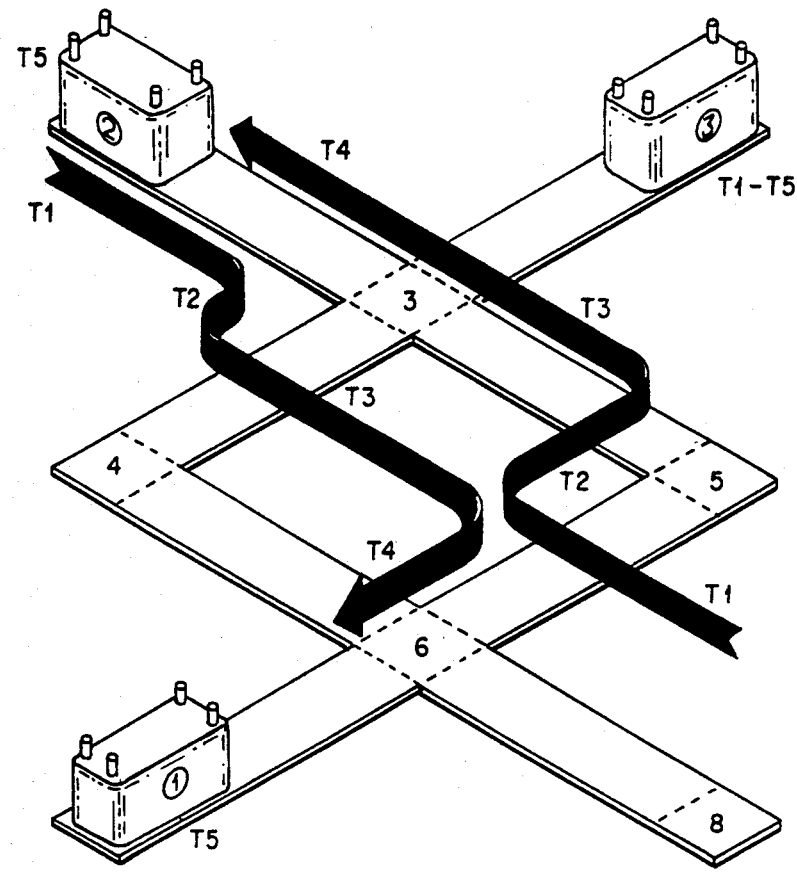
FIG. 16 is a drawing showing the displacement at the end of the fifth time interval for both of the AGVs at their destinations as given in FIG. 8.
FIG. 17 is a list of the rules in effect for the AGV movements depicted in FIG. 16.

FIG. 16 shows that from Node 3 AGV 2 must move to Node 1 (which is its final destination). AGV 1 has reserved Node 1 at the first time interval. AGV 2's earliest possible arrival at Node 1 is at the fifth time interval. The rule of travel for AGV 2 which was established at Node 3 allows AGV 2 to arrive at nodes after AGV 1. AGV 2's move to Node 1 during the fifth time interval does not violate the rule. Therefore AGV 2 can move to Node 1 during the fifth time interval and arrive at its destination without conflict with either of the other vehicles. As shown in FIG. 17, by the end of the fifth time interval, all the rules of travel have been satisfied.

Figures 18, 19:
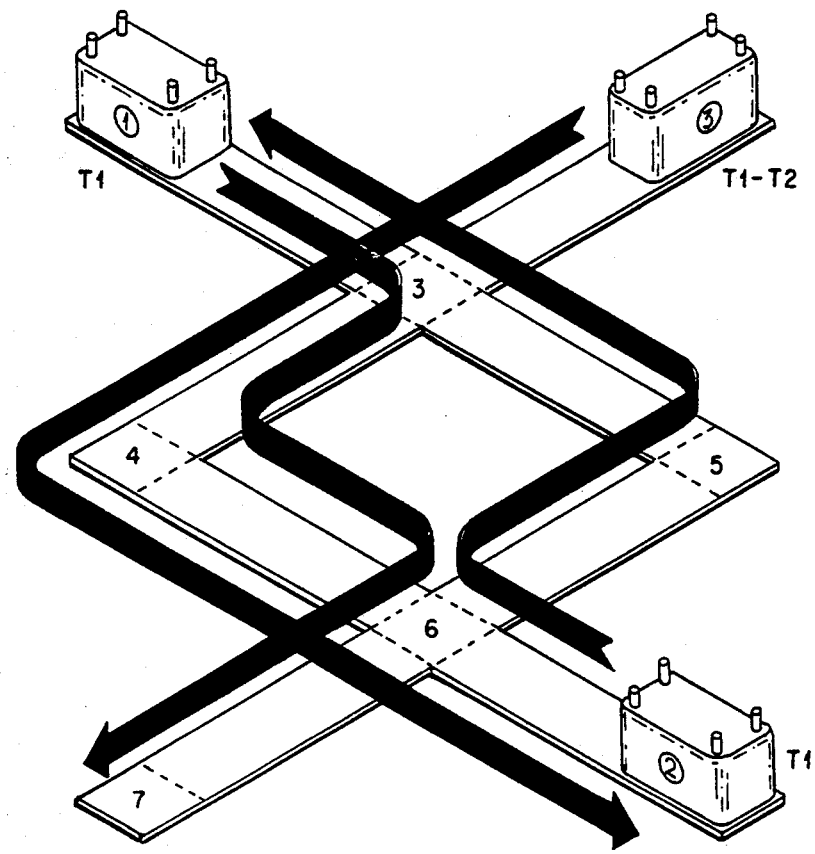
FIG. 18 is a drawing showing a desired path for each of three AGVs to follow in the typical factory illustrated in FIG. 6.
FIG. 19 is a list of the rules in effect for the AGV movements depicted in FIG. 18 for the first time interval.

In FIGS. 18 and 19, the path for AGV 3 will be superimposed on the previous paths for AGV 1 and AGV 2. AGV 3 will start moving from Node 2, will pass through Nodes 3, 4, and 6 and will stop at Node 8. Nodes 3 and 6 are common to all three AGVs' paths and Node 4 is common to AGV 1's path; thus, a conflict exists between the AGVs.

FIG. 18 shows the nodal positions for the first time interval for all three AGVs. FIG. 18 also shows the desired paths for each of the three AGVs. FIG. 19 shows the rules in effect for the first time interval. The paths selected for AGV 1 and AGV 2 are the same as those given in FIG. 8. AGV 1 and AGV 2 will pass through Nodes 3 and 6 and AGV 1 already has selected a path through Node 4. Therefore, for AGV 3 to move from Node 2 to Node 8 a new path must be generated without changing the paths for AGV 1 and AGV 2.

Figures 20, 21:
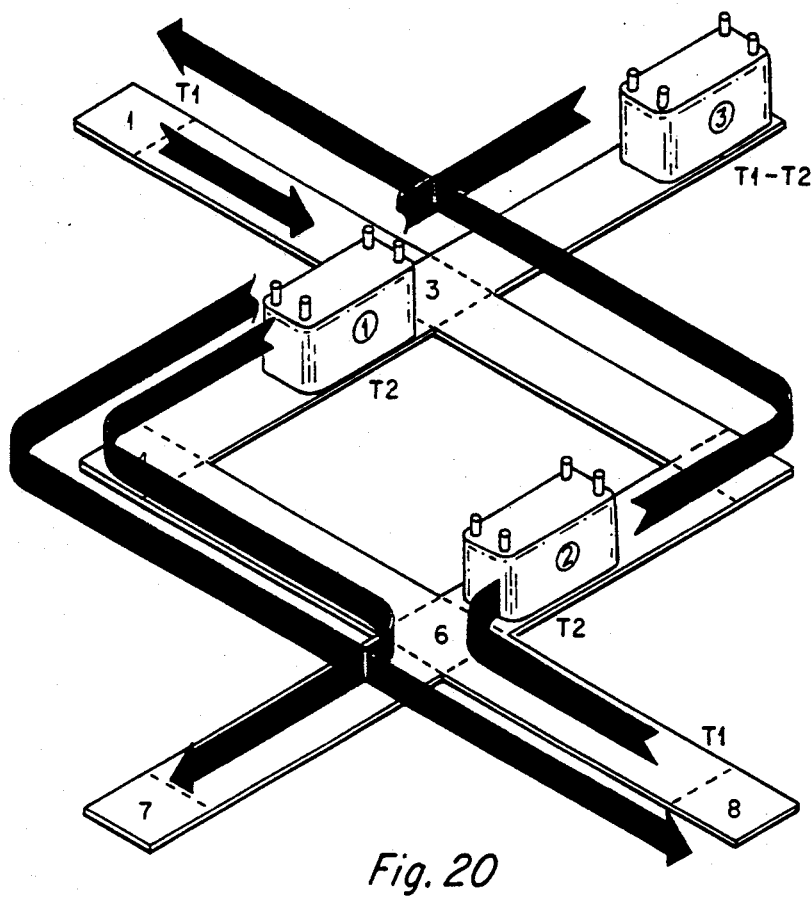
FIG. 20 is a drawing showing the displacement at the end of the second time interval for each of the AGVs enroute to their destinations as given in FIG. 18.
FIG. 21 is a list of the rules in effect for the AGV movements depicted in FIG. 20 for the second time interval.
Figures 22, 23:
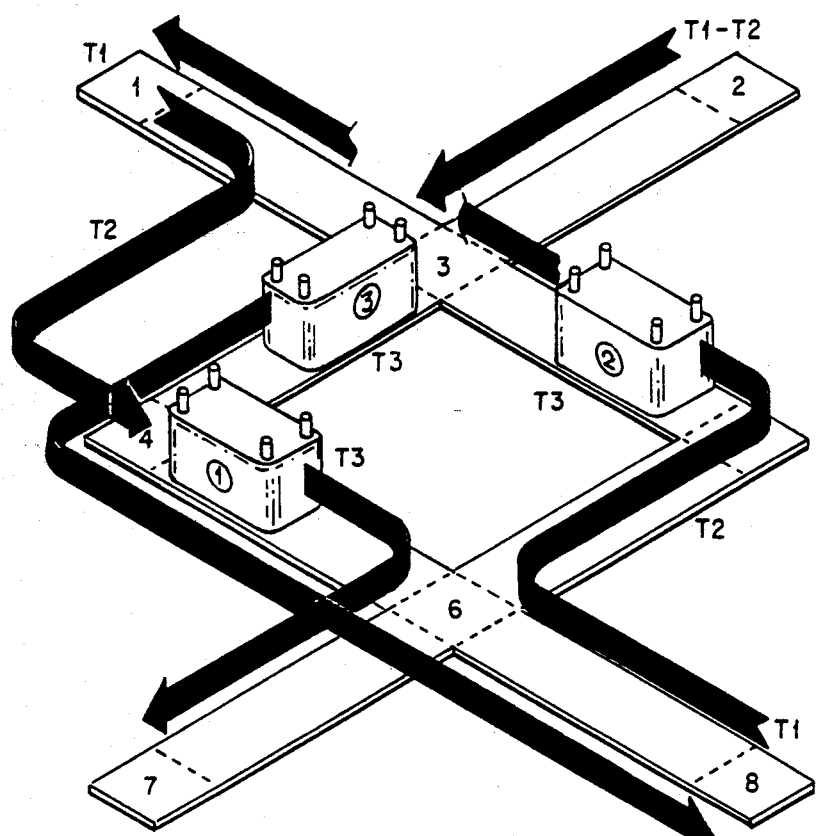
FIG. 22 is a drawing showing the displacement at the end of the third time interval for each of the AGVs enroute to their destinations as given in FIG. 18.
FIG. 23 is a list of the rules in effect for the AGV movements depicted in FIG. 22 for the third time interval.

This means that AGV 3 can't move until the third time interval (T3). As shown in FIG. 22, AGV 3 must first attempt to move to Node 3. As shown in FIGS. 20 and 21, the earliest possible arrival time at Node 3 for AGV 3 would be the third time interval. Because AGV 1 already has planned to occupy Node 3 during the second time interval, AGV 3 can't move to Node 3 during the second time interval. The next available time interval for Node 3 which has not been reserved is the third time interval. Because AGV 3 will arrive at Node 3 after AGV 1 and before AGV 2, the rules of travel for AGV 3 are established as shown in FIG. 23 such that AGV 3 must arrive at nodes after AGV 1 until AGV 3 visits a node which is not common to AGV 1; furthermore, AGV 3 must arrive at nodes before AGV 2 until AGV 3 visits a node which is not common to AGV 2.

Figures 24, 25:
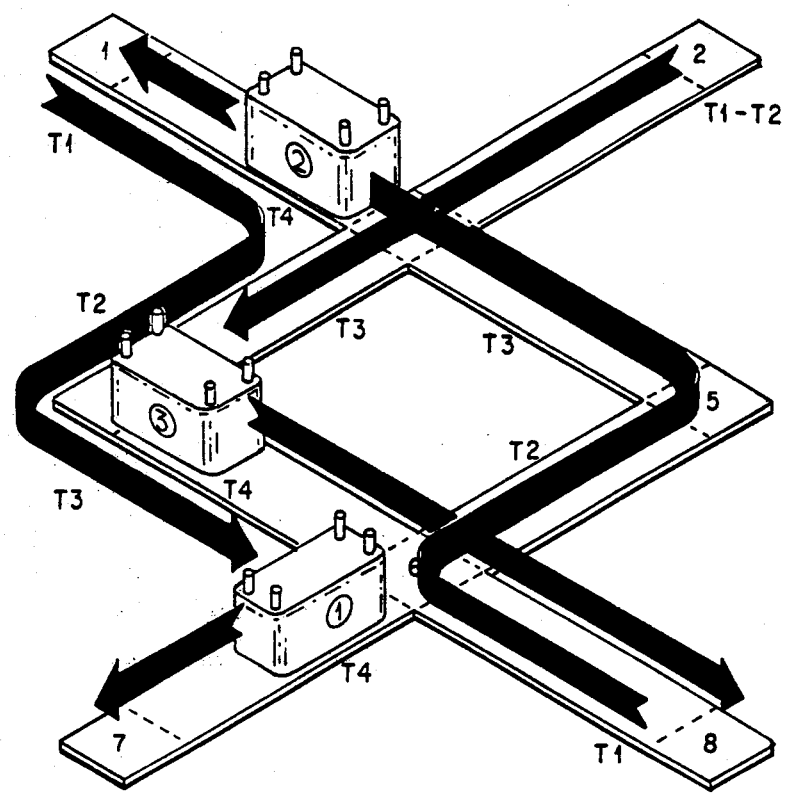
FIG. 24 is a drawing showing the displacement at the end of the fourth time interval for each of the AGVs enroute to their destinations as given in FIG. 18.
FIG. 25 is a list of the rules in effect for the AGV movements depicted in FIG. 24 for the fourth time interval.

As shown in FIG. 24, from Node 3 AGV 3 has two possible moves. The first choice is Node 4. The earliest possible time AGV 3 could occupy Node 4 is the fourth time interval. Because AGV 1 already has Node 4 reserved for the third time interval (see FIG. 23), AGV 3 must arrive at Node 4 after AGV 1. The current rule of travel for AGV 3 allows AGV 3 to arrive at nodes after AGV 1. Therefore AGV 3 can move to Node 4 during the fourth time interval without violating any rules.

AGV 3's second choice for a move from Node 3 is to Node 5. The earliest possible time AGV 3 could occupy Node 5 is the fourth time interval. As shown in FIG. 23, because AGV 2 already has Node 5 reserved for the third time interval. AGV 3 can only arrive at Node 5 after AGV 2. The current rule of travel for AGV 3 allows AGV 3 to arrive at nodes before AGV 2. Because AGV 3 can only occupy Node 5 after AGV 2, AGV 3 can't move to Node 5 without violating the current (T3 and T4) rule of travel.

Because AGV 3 can't move to Node 5 without violating the rules of travel, AGV 3 will move to Node 4 during the fourth time interval. AGV 2 will not occupy Node 4 at any time; therefore the rule of travel for AGV 3 which applies to AGV 2 will no longer be valid. The rule of travel for AGV 3 which applies to AGV 1 is still valid and will be enforced on subsequent nodes.

Figures 26, 27:
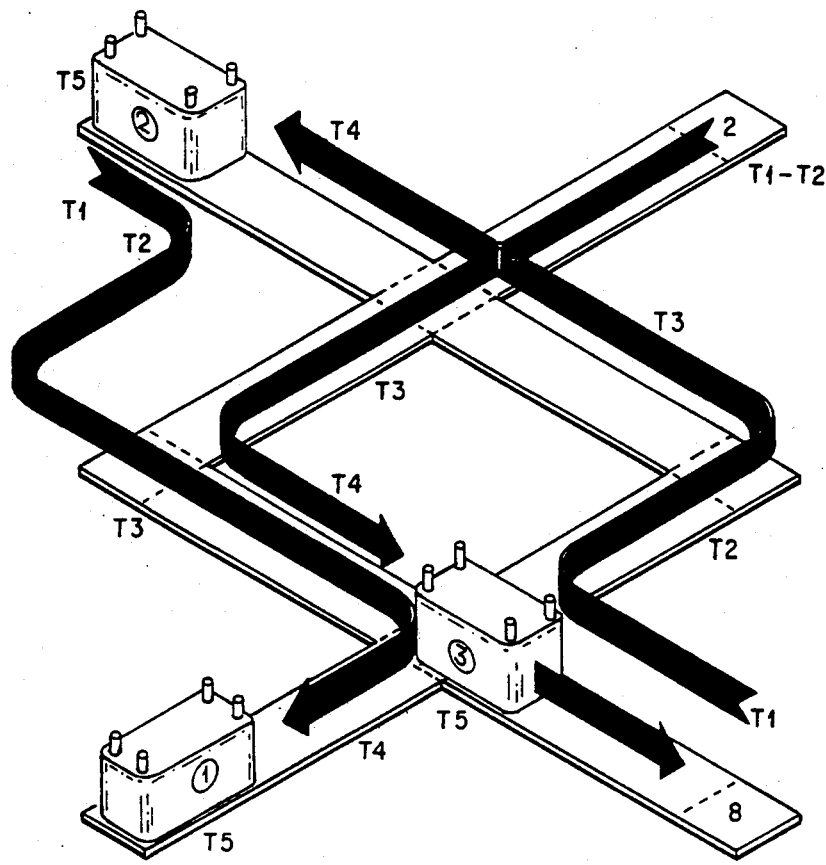
FIG. 26 is a drawing showing the displacement at the end of the fifth time interval for each of the AGVs enroute to their destinations as given in FIG. 18.
FIG. 27 is a list of the rules in effect for the AGV movements depicted in FIG. 26 for the fifth time interval.

As shown in FIG. 26, AGV 3 must move to Node 6 next. Both AGV 1 and AGV 2 have reserved Node 6. AGV 3's earliest possible arrival at Node 6 is at the fifth time interval (T5). The only rule of travel for AGV 3 which is currently in use states that AGV 3 must always arrive at nodes after AGV 1 until AGV 3 visits a node which is not common to both AGV 1 and AGV 3. AGV 3's arrival at Node 6 during the fifth time interval is after AGV 1's arrival during the fourth time interval; therefore the current rule of travel will not be violated. As shown in FIG. 27, because AGV 3 will arrive at Node 6 after AGV 2, an additional rule of travel for AGV 3 will be established such that AGV 3 must always arrive at nodes after AGV 2 until AGV 3 visits a node which is not common to the AGV 2 and AGV 3.

Figures 28, 29:
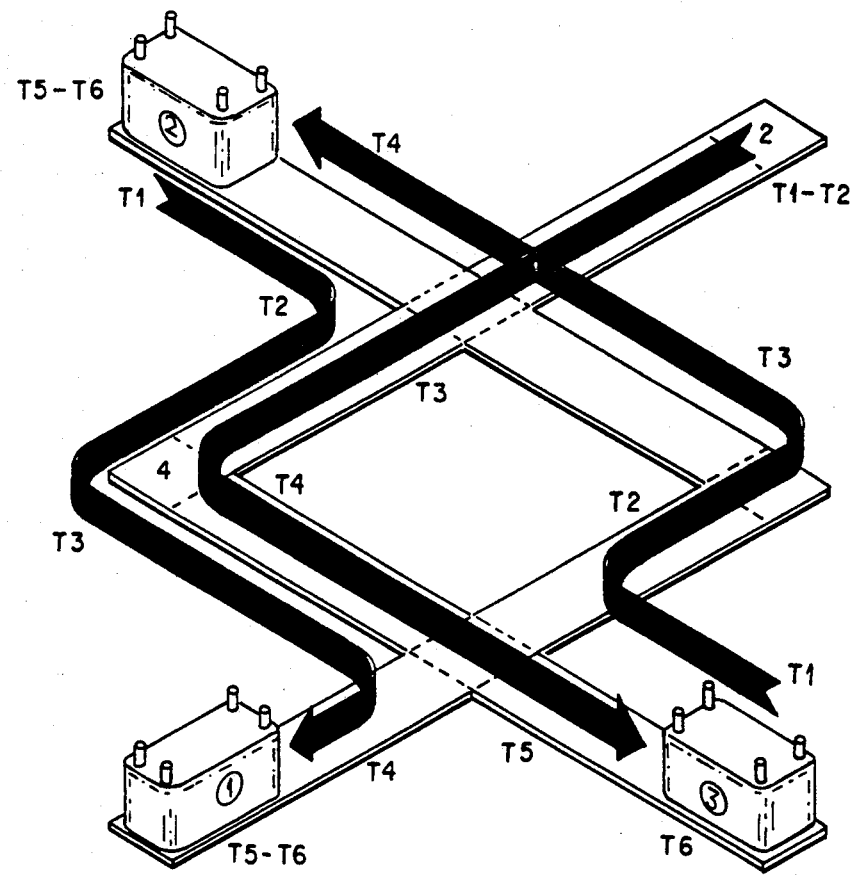
FIG. 28 is a drawing showing the displacement at the end of the sixth time interval for each of the AGVs at their destinations as given in FIG. 18.
FIG. 29 is a list of the rules in effect for the AGV movements depicted in FIG. 28 for the sixth time interval.

As shown in FIG. 28, from Node 6 AGV 3 must move to Node 8 which is AGV 3's final destination. AGV 2 has reserved Node 8 at the first time interval. AGV 3's earliest possible arrival at Node 8 is at the sixth time interval. The rule of travel for AGV 3 which was established at Node 6 allows AGV 3 to arrive at nodes after AGV 2. AGV 3's move to Node 8 during the sixth time interval does not violate the rule. Therefore AGV 3 can move to Node 8 during the sixth time interval and arrive at its destination.

By applying the rules of travel at each node, travel plans have been generated for each AGV which coordinate the movement of each AGV with all other AGVs. Provided the plans are executed in the defined sequence, the AGVs will be able to move to their destinations without deadlocks or collisions.

The flowcharts detail the invention's operation.

PROGRAM OVERVIEW

The invention is one of a number of independent software routines which run at the direction of a system executive and communicate with a central data base. Some of the other tasks provide the data base with information which is important for the invention's programs. This information includes the list of nodes an AGV will visit in the factory, the current system time, whether a node is occupied (and, if so, by which AGV), whether a node has been occupied (and, if so, by which AGVs), the distance or travel time between nodes, the number and identity of AGVs active in the system, and whether an AGV has a path identified for its use.

Various other tasks determine this information and place it in the data base. The function of the invention is to use this data to apply its rules to compile travel plans which allow the AGVs to move to their destinations without collisions or deadlocks.

Figure 30:
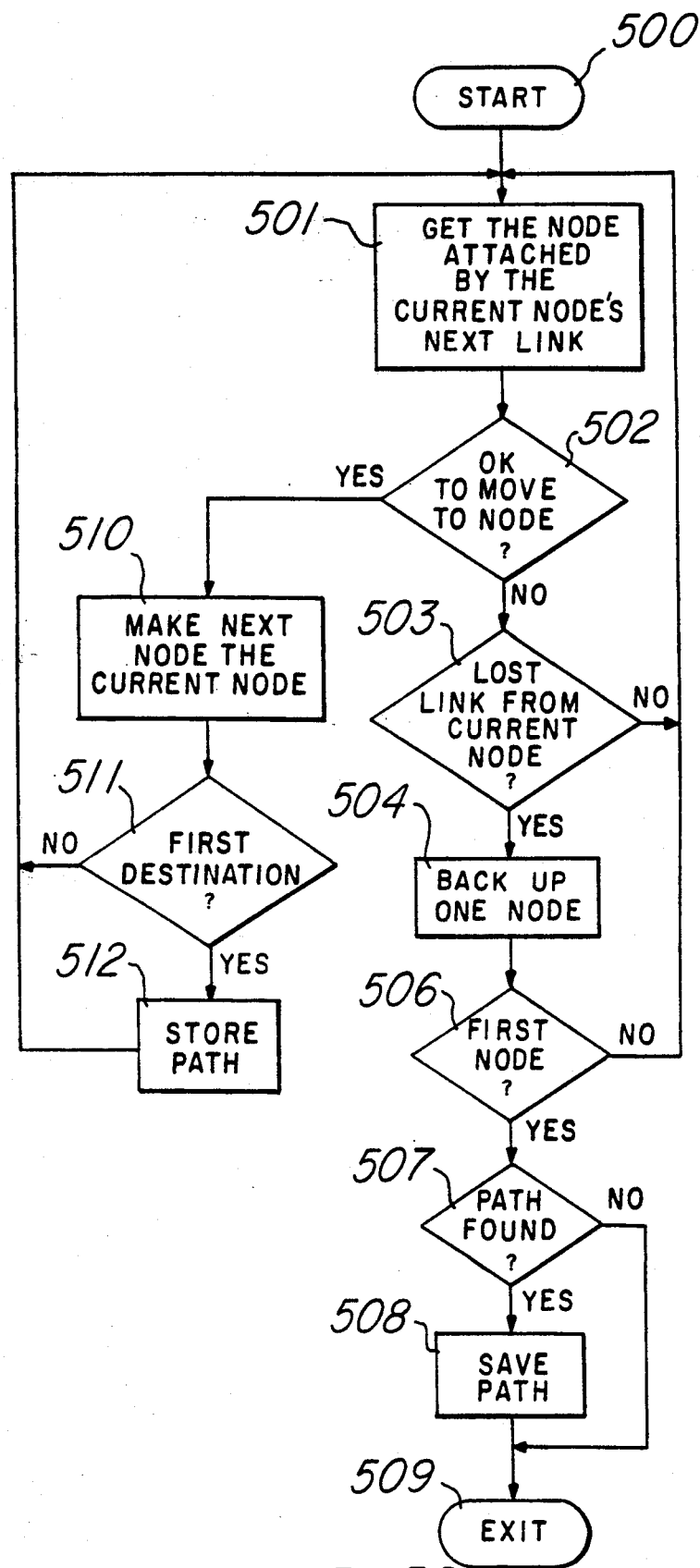
FIG. 30 is a functional block diagram of the control method of the invention.

FIG. 30 illustrates the high-level view of the invention. The program's overall operation is that of a loop. It queries the data base for information about a specific node, which it checks for occupancy by an AGV, or for scheduled use by an AGV. It compares the data about the node with data for the previous node and, depending upon whether the comparison indicates a conflict, either passes the node and goes on to the next node in the path or continues checking nodes until it finds a clear path (i.e., a path without conflicts). The program continues in this fashion until all the nodes in a path segment (a list of nodes to be visited in sequence) have been checked and all conflicts have been resolved. This process constitutes defining a path.

The following paragraphs and flowcharts detail the methods the invention employs to set rules and to check nodes for possible conflicts. The output of these procedures is expressed in arrival and departure times for the AGVs at the nodes in the list. The totality of this output constitutes the paths for the AGVs. Paths are stored in "final path tables" in the data base for use by other programs in the associated AGV control system.

CHECKING THE RULES FOR A NODE

Figure 31:
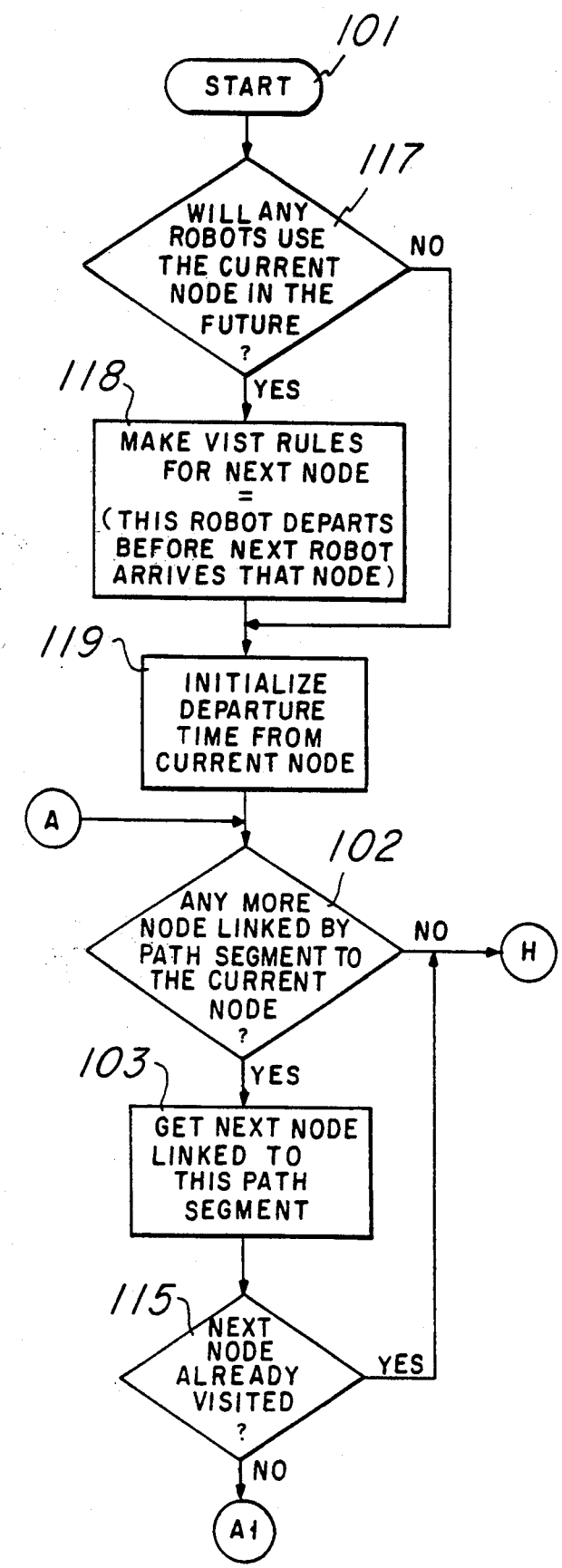
FIG. 31 is a flowchart illustrating the method used to make the first rule check.

As shown in FIG. 31, the program starts by "fetching" an AGV's current node from a node list in the control system's data base. It checks at step 117 to determine whether any other AGV will use this node. If not, there is no need to set rules for the node, so control passes to step 119. However, if even one AGV will use the current node, then the rule set at step 118 ensures that no other AGV will arrive at the node before the scheduled AGV departs. In effect, the node has been "reserved" for the intended AGV.

It is important to note that this invention retrieves an AGV's location by retrieving this information from a data base. Another program or controller external to the invention uses sensors or some other means to determine the location and then stores the location in the data base for this invention to use.

Returning to the discussion of FIG. 31, once the use of and rules for the current node are set, the program initializes a departure time for the current node. This is possible because the program has determined how the current node is to be used. Entry to the program at this point from A is determined by whether the loop for the current AGV's path is complete (see FIG. 34, steps 302 through 307, which will be described presently).

Figure 35:
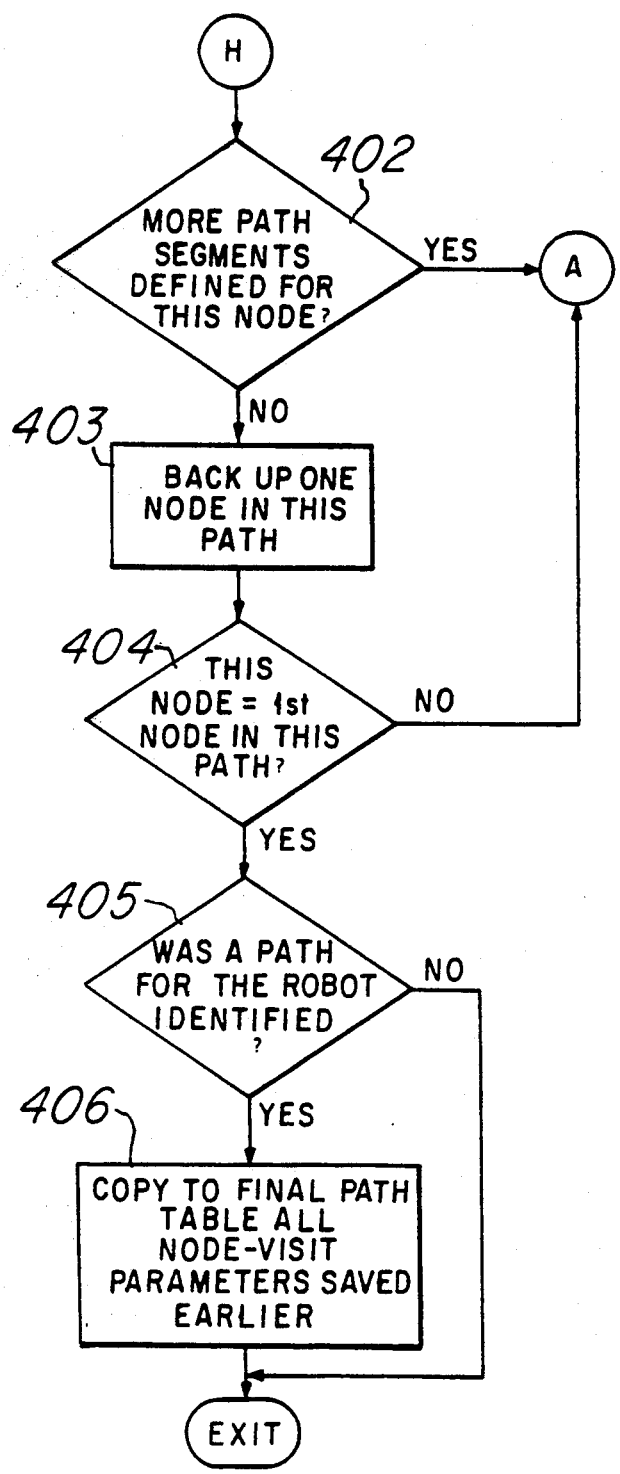
FIG. 35 is a flowchart illustrating the method used to continue node-checking (for continuous-segment paths).

The next important parameter to determine is whether the current node is linked to subsequent nodes in a path segment, as at step 102. If not, program flow at H (FIG. 35) determines the next node to be checked. The discussion for FIG. 35 describes this process in more detail. Essentially, once the program determines it has searched all possible paths it puts all the data relating to that path segment in a table in the control data base for use by other parts of the AGV control system.

On the other hand, if more nodes are linked to the current node, then the path is not yet complete and program flow is to step 103 (in FIG. 31). The program then retrieves another node from the data base and checks (as at step 115) whether it has been visited. If so, the program flow must again determine whether the search is complete.

CHECKING ARRIVALS, DEPARTURES, AND RULE STATUS

Figure 32:
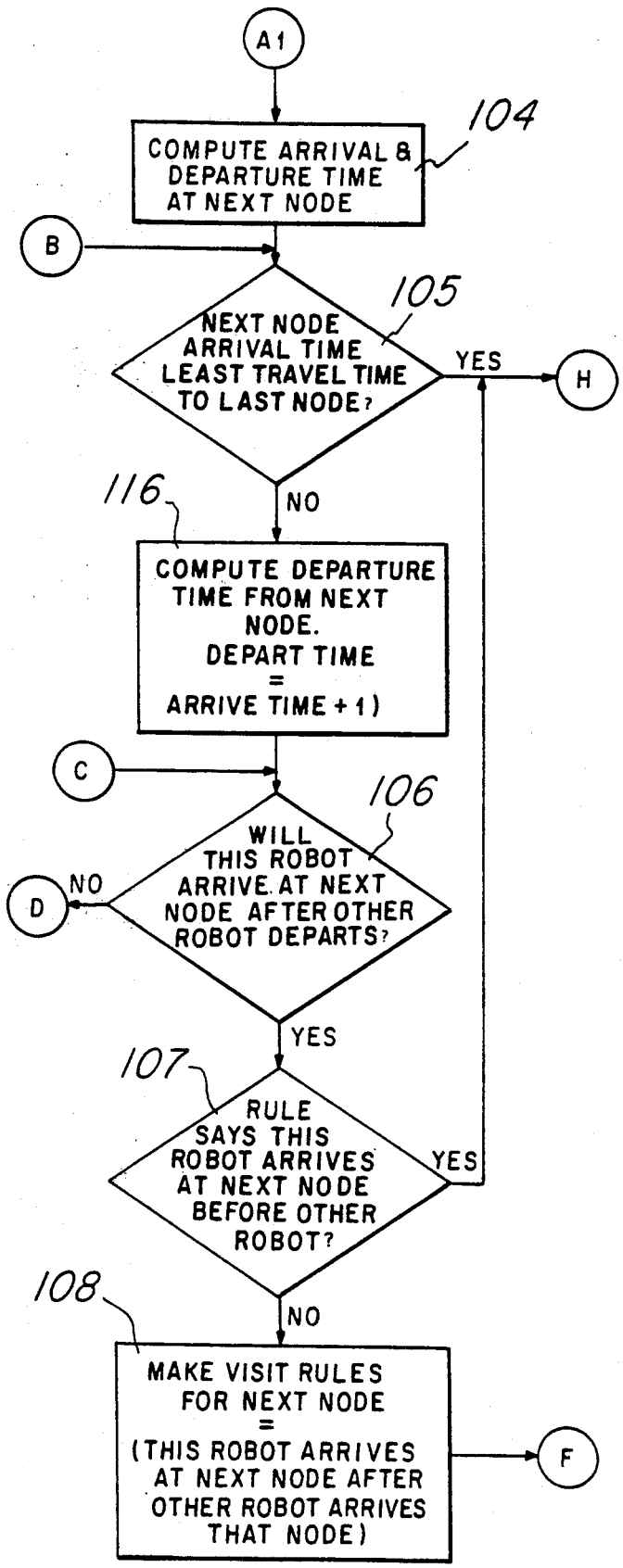
FIG. 32 is a flowchart illustrating the method used to check the arrival/departure time and rule status at the next node in a path.

Turning now to FIG. 32, it can be seen that if the node has not been visited, the program calculates a new arrival and departure time at step 104.

Step 105 is a check to determine whether the arrival time at the node is later than the shortest travel time to the destination node. This check ensures that each unique path from the start node to the destination node is shorter than the previous path (eventually, only the shortest is saved). If the answer is "Yes," then program flow transfers to H (see FIG. 35) to determine whether the program has reached the last node in the path segment. If the answer is "No," then the program must compute (at step 116 of FIG. 32) a new departure time such that the departure can take place only after the scheduled arrival.

Figure 33:
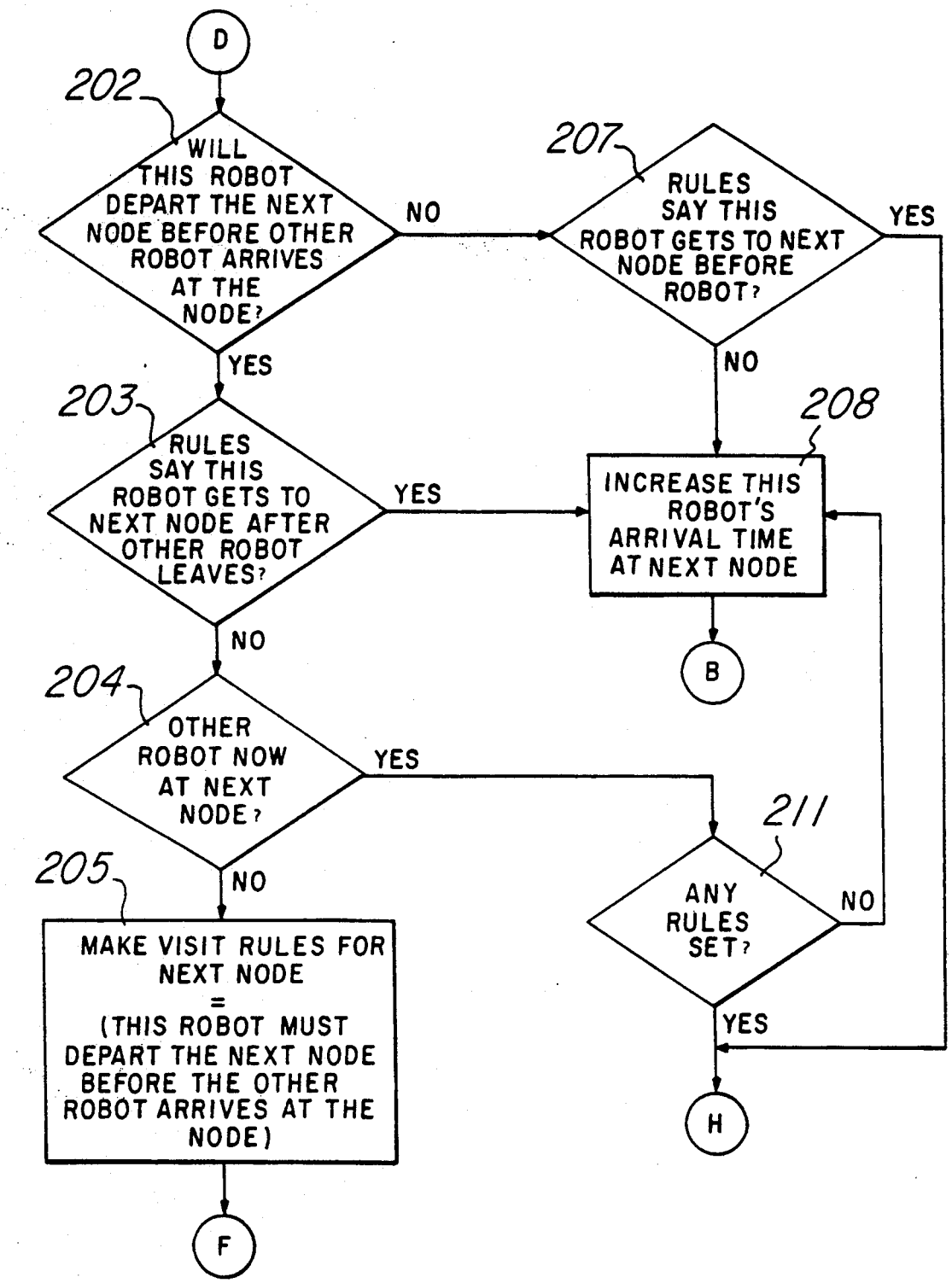
FIG. 33 is a flowchart illustrating the method used to check for rule conflicts with other AGVs at the next node in the path.

As shown in FIG. 32 at step 106, the next step is to check the node to be sure the computed arrival time does not conflict with the departure of an AGV already at the next node. When there is more than one AGV in the system, it is important to determine which AGV is to visit the node first. When another AGV is at the next node, the program branches to D (see the discussion for FIG. 33, below). Otherwise, as at step 107, the program checks to determine whether a rule is established so the AGV arrives at the next node before another AGV. If there is such a rule, then the program again branches to H (FIG. 35) to check for the end of the path segment. If there is no such rule, then at step 108 the program sets the rules for the next node so that the scheduled AGV arrives at that node only after any other AGV leaves that node. The logic is straightforward: it has been determined that the scheduled AGV must visit the node; therefore, it must do so either before or after other AGVs. The invention's primary function is to make sure that two AGVs don't occupy the same space at the same time.

CHECKING FOR RULE CONFLICTS WITH OTHER AGVs

When there is a conflict, as at step 106 ("No") in FIG. 32, the rules must be used to determine how to avoid a physical conflict (one AGV crashing into another at the conflicting node) or a deadlock. As shown for program connector D (described in FIG. 33), the result of the conflict check at step 202 is the establishment of one of two rules for the node. Either the target AGV is to be allowed to arrive at the next node before another AGV (as at step 207), or it is to be delayed to arrive after another AGV (step 208). The decision to be made at step 203 is a check to determine the possibility of a logical conflict. In other words, it has been determined (step 202) that the target AGV will leave the target node before any other AGV arrives, but step 203 addresses the question of whether it is supposed to do that. If the answer to the question posed at 203 is "Yes," then there is a rule conflict and the target AGV's arrival time must be extended to avoid the conflict. If the answer at step 203 is No, then there is no logical conflict and the program checks at step 204 to determine whether the target node is free (no other AGV currently occupies the node). If the node is free (corresponding to an answer of "No"), the program assigns (at step 205) the appropriate visit rules to the node and continues to the part of the program which checks for additional nodes in the path segment. If the node is occupied ("Yes" at step 204) the program checks at step 211 for rules concerning the occupation. If there are no rules, the target AGV's arrival time must be delayed to allow the occupying AGV to leave the node. If there are rules set for the node, then program flow again branches to the routines which check the current node to determine whether it is the final node in the path (see FIG. 35).

WHEN THERE IS NO PHYSICAL CONFLICT

Returning now to FIG. 32 at step 106, the other possibility is that there is no conflict. For example, there can't be a physical conflict (a crash) if the target AGV arrives at the next node after another AGV departs. Still, there could be a logical conflict, as at step 107 if a rule exist such that the target AGV is intended to arrive at the next node before any other AGV. If that is the case, the program must determine whether the target node is the last node in the path segment (see the discussion of FIG. 35). If there is no physical or logical conflict (step 107, "No"), then the program is free to set the visit rules for the target node as at step 108.

CHECKING AND RESETTING RULE STATUS

At several points in the program, it is necessary to determine whether the loop should be continued. The question posed is whether the program has checked the external data base information for all possible AGVs in the system.

Figure 34:
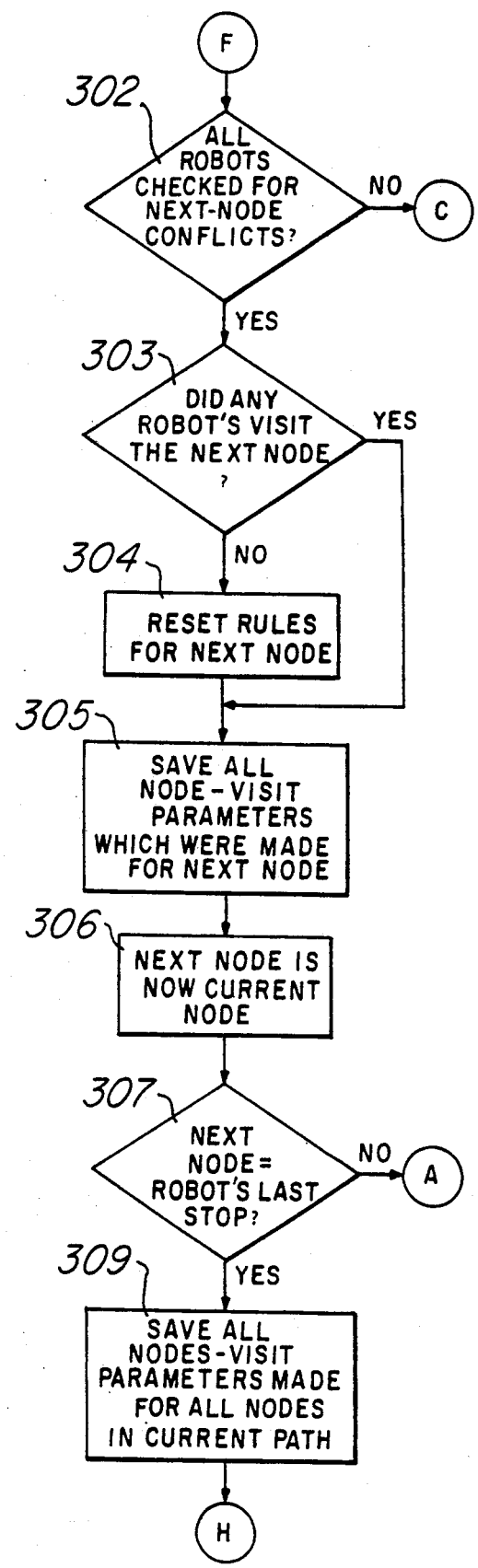
FIG. 34 is a flowchart illustrating the method used to check and reset rule status for the next node in the path after checking all possible rule conflicts at the node.

As shown in FIG. 34 at step 302 the question raises two possibilities: either all the AGVs have been checked or there remains the possibility that a physical conflict could occur. If the answer is "No," the program returns (program connector C, described in FIG. 32) to the point where the check for possible physical conflict is made. Program flow from that point is described above. If the answer at step 302 is "Yes," then all other AGVs have been checked and possible physical or logical conflicts have been resolved using the rules.

The final possibility is that no AGVs at all occupied the target node. In such a case (as at step 303 "No") the program simply clears the rules for that node; obviously, if the node isn't used then there is no need to set rules for it. However, if even one AGV uses the node (step 303 "Yes") then the rules which have been established as a result of the conflict-resolving decisions must be set for the node. As shown at step 305, the rules are saved. Then the target node is declared the current node (at step 306) and the program determines (by accessing the external data base) whether the next node is the AGV's destination. If it is, then the program saves all the rules and node-visit data for the current path. If the next node is not the AGV's destination, the program loops (connector A, described in FIG. 31) to the point where it checks for additional nodes in the current path segment. The re-entry point is in FIG. 31 at step 102, which was discussed earlier. In effect the program loops back on itself and begins making node and conflict checks for the next node(s) in the path.

CONTINUE CHECKING NODES FOR CONTINUOUS PATHS

Figure 36:
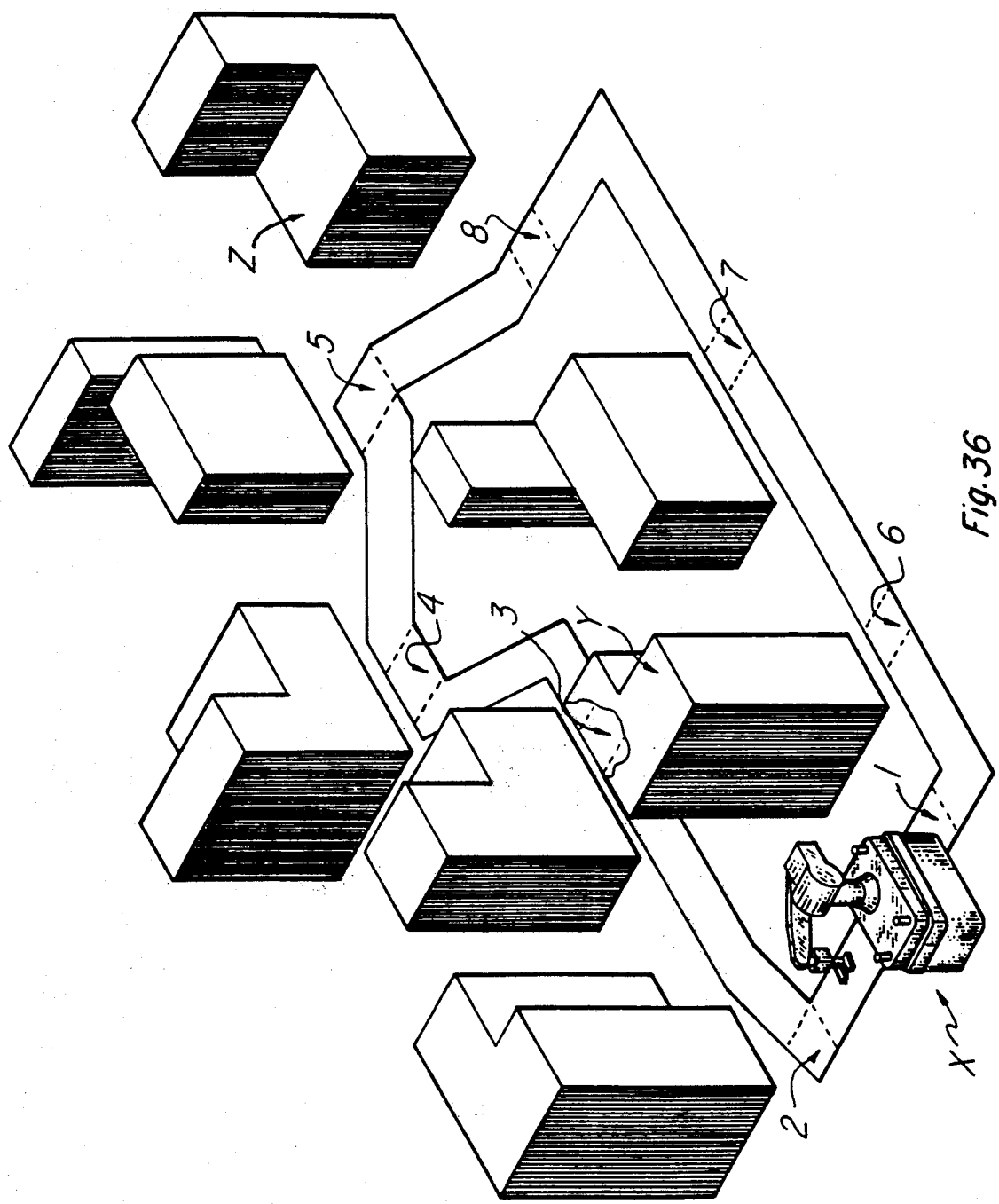
FIG. 36 is a drawing showing how the invention checks path segments to determine when all possible routes to a goal have been checked.

At several points in the program (connector H, described in FIG. 35), it is necessary to determine how to continue the node and conflict checks. As shown in FIG. 36, this part of the program provides a means to determine an AGV's route. That is, the routine described as H (FIG. 35) serves the purpose of determining whether all possible paths from AGV origin to AGV destination have been checked. FIG. 36, for example, shows two possible paths for an AGV (X) between its origin Y at Node 1 and its destination Z at Node 8. The AGV can move through the node sequence 1, 2, 3, 4, 5, 8 or 1, 6, 7, 8 to get from Y to Z. Assuming the AGV takes the same amount of time t to move between each pair of nodes, there is a difference of 5t−3t, or 2t between the two routes. Further assuming no other AGV interferes at Node 6 or Node 7, it is desirable to move AGV X through the path defined by Nodes 1, 6, and 7 because it will arrive at Node 8 sooner.

For the remainder of this discussion, place FIG. 31, FIG. 32, FIG. 35, and FIG. 36 where they can be viewed simultaneously. The invention's routine H accomplishes route-checking in the following manner.

Suppose that the external control system has determined that AGV X must go from Node 1 to Node 8. Beginning at Node 1 (Y in FIG. 36), the loop determines at step 402 of FIG. 35 whether other nodes remain to be checked (both Node 2 and Node 6 are possible). It checks (as at A, in FIG. 31) the path segment defined by Node 1 and Node 2. Finding that another node is linked to the current node (step 102, Yes), the invention retrieves information about that node from the data base and at step 115 begins checking the rules of travel and computing arrival and departure times for the AGV at Node 2. At step 105 the answer is Yes because there is no other travel time to compare (the routine has not yet established another route—one possibility being the node sequence 1, 6, 7, 8), which leads the program back to H and step 402 in FIG. 35 again.

Once again, the answer at 402 is Yes, because Node 3 is linked to Node 2 (the current node). And, just as before, the program branches to A where at step 102 it once again determines that Yes is the answer. The routine continues in this fashion as the nodes are checked in the sequence 4, 5, and 8. But, once Node 8 is reached at step 402 (FIG. 35), there are no more path segments defined. That is because Node 8 is the destination and the path is terminated.

When the routine reaches the destination node, the answer at step 402 is No, which causes the routine to back up one node (step 403) and to check at step 404 whether that node is the first node in the path. If the answer is Yes, then the path is complete. It is verified at step 405, where a valid path is saved and an invalid path is abandoned. If the answer at step 404 is No (as it will be for all but the first node in a path), the program branches yet again to A. However, the answer this time at step 102 of FIG. 31 will be No, which causes the routine to branch to H. At step 402 this time the answer will be No, so the routine backs up one more node and repeats the loop. The routine continues checking the nodes in backward order in this fashion until it reaches the first node in the path sequence. When that happens, the answer at step 404 is Yes, the answer at step 405 is Yes, and the path is saved. When a path has been identified, then the program makes a copy of the rules it has stored for the path and sends this copy to the external data base.

For each such path the routine identifies, the method provides a means to compare it with all other links so another program can determine the path to use. Another task (a scheduler, for example) can compare the total travel times and select the shortest time. Or, it could select a path which visits a particular node (if, for example, the scheduler determines the AGV must visit Node 4 to pick up a load on its way to Z, then the path selected would be that through Nodes 1, 2, 3, 4, 5, and 8).

In summary, the program checks all possible pathways by stepping forward toward the goal one node at a time, then by back-tracking from the goal one node at a time (checking for additional pathways). This process is analogous to climbing a tree. One proceeds from the base upward toward the goal (the top). As the tip of a branch is reached, the climber goes back down until a fork is reached. The climber then shifts to the other branch of the fork and continues upward. If the climber thus checks every fork, he eventually will have checked all possible branches leading to the destination. The invention's scheme adds to this technique by recording in the central data base a record of all possible pathways to the goal.

what is claimed is:

1. A method of scheduling the routes for a plurality of AGVs, implementable in a computer, comprising:
    (a) defining a plurality of paths, each of which comprises a beginning node and an ending node with a plurality of nodes in between, each path of the plurality of paths containing nodes common with other of said plurality of paths;
    (b) determining which of said plurality of paths permit a given AGV to reach a destination node from an origin node;
    (c) selecting and assigning one of said possible paths to said given AGV;
    (d) calculating the times that each node along said assigned path would be occupied by said given AGV; and
    (e) assigning each node along the assigned path to said given AGV for the calculated time needed to be occupied by said given AGV.

2. The method of claim 1, further comprising:
carrying out step (b) wherein said all possible paths do not include at least one node already assigned to another AGV for the same time period that said given AGV would need to occupy said at least one node.

3. The method of claim 2, further comprising:
wherein the selected and assigned path of step (c) is the possible path which would take said given AGV the shortest time period to traverse.

4. The method of claim 2, wherein:
steps (b) through (e) are carried out by a computer.

5. The method of claim 4, wherein:
step (e) includes the step of storing in computer memory, data indicating the various times that any given node would be occupied by any given AGV.

* * * * *